United States Patent
Meyer et al.

(10) Patent No.: US 8,228,915 B2
(45) Date of Patent: Jul. 24, 2012

(54) TECHNIQUE FOR HANDLING RESIDUAL SPACE IN PACKET DATA TRANSMISSIONS

(75) Inventors: Michael Meyer, Aachen (DE); Henning Wiemann, Aachen (DE); Sabine Sories, Aachen (DE)

(73) Assignee: Telefonaktiebolaget LM Ericsson (publ), Stockholm (SE)

( * ) Notice: Subject to any disclaimer, the term of this patent is extended or adjusted under 35 U.S.C. 154(b) by 233 days.

(21) Appl. No.: 12/666,093

(22) PCT Filed: Jun. 25, 2007

(86) PCT No.: PCT/EP2007/005616
§ 371 (c)(1),
(2), (4) Date: May 10, 2010

(87) PCT Pub. No.: WO2009/000295
PCT Pub. Date: Dec. 31, 2008

(65) Prior Publication Data
US 2010/0238931 A1    Sep. 23, 2010

(51) Int. Cl.
*H04L 12/28* (2006.01)
*H04L 12/56* (2006.01)
(52) U.S. Cl. ...................................... 370/392

(58) Field of Classification Search .............. 370/392
See application file for complete search history.

(56) References Cited

U.S. PATENT DOCUMENTS

| | | | |
|---|---|---|---|
| 5,521,940 A * | 5/1996 | Lane et al. | 375/240 |
| 6,779,069 B1 * | 8/2004 | Treichler et al. | 710/305 |
| 6,859,466 B1 * | 2/2005 | Chen et al. | 370/509 |
| 7,447,233 B2 * | 11/2008 | Narad et al. | 370/473 |
| 2007/0058565 A1 | 3/2007 | Wiatrowski et al. | |
| 2007/0091886 A1 | 4/2007 | Davis et al. | |

FOREIGN PATENT DOCUMENTS
DE    1015691 A1    4/2003

* cited by examiner

*Primary Examiner* — Ayaz Sheikh
*Assistant Examiner* — Blanche Wong
(74) *Attorney, Agent, or Firm* — Coats & Bennett, PLLC

(57) ABSTRACT

The invention relates to techniques for handling residual space occurring in packet-based data transmissions, wherein according to one embodiment of a method for controlling a packet-based data transmission, in case an amount of residual space in the packet (300) is below a predefined threshold value, a last one of one or more sub-headers (304) in the header (302) of the packet (300) is constructed by setting a length indicator (LF) to a value indicating to a receiver that no further sub-header follows.

24 Claims, 12 Drawing Sheets

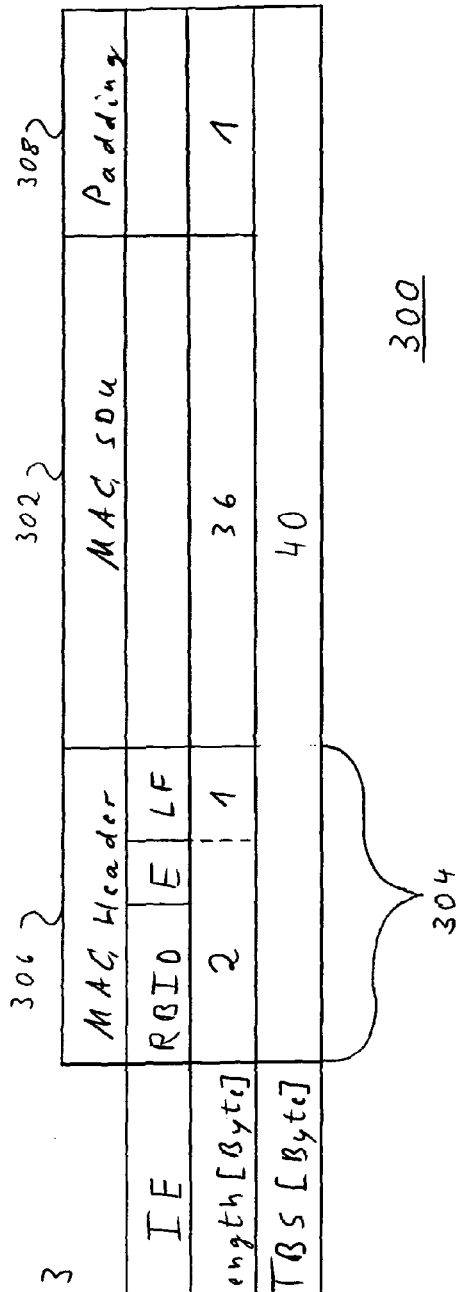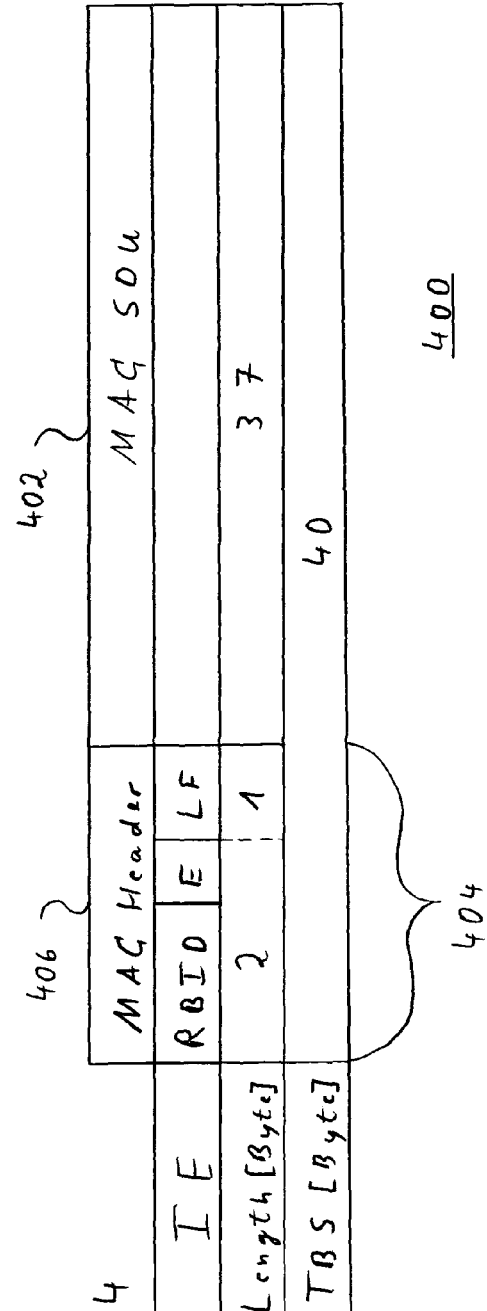

Fig. 9

| IE | MAC Header | | | | MAC SDU | Padding |
|---|---|---|---|---|---|---|
| Length | SPF | RBID | E | HP | 37 bytes | 1 byte |
| | 2 bit | 8 bit | 1 bit | 5 bit | | |
| TBS | | | | | | |

904 ⟵ MAC Header
900
40 bytes
906, 902, 908

Fig. 10

| IE | MAC Header | | | | | MAC SDU | Padding |
|---|---|---|---|---|---|---|---|
| Length [Byte] | SPF | RBID | E | LF | RBID PAD | 34 | 1 |
| | | 5 | | | | | |
| TBS [Byte] | | | | | | | |

1006 ⟵ 1008
40
1004, 1002, 1010
1000

TECHNIQUE FOR HANDLING RESIDUAL SPACE IN PACKET DATA TRANSMISSIONS

TECHNICAL FIELD

The invention relates to packet-based data transmissions, and more particularly to techniques for handling residual space occurring in data packets when the data is provided in one or more data blocks.

BACKGROUND

The transport of data in packet-based communication systems normally requires that the data are subdivided into data blocks which fit into the packets. However, various services and applications exist which provide their data already in the form of data is blocks to the communication system. For example, a speech service such as Voice over IP (VoIP) may require the transmission of one data block with a constant or slightly varying size, e.g. 32 byte to 38 byte, every 20 milliseconds from the transmitter towards the receiver. With their sizes predetermined by the respective service or services, one or more data blocks may or may not fit into a packet size provided by the underlying communication system.

Therefore, in the general case, one or more data blocks will not fit exactly into one packet. Rather, after inserting the one or more data blocks into a payload portion of the packet and after constructing a header portion, there will be some residual space left over in the packet. The residual space may span a few bits or bytes only, but may also involve the larger part of the available payload ('payload' and 'payload portion' will be used synonymously hereinafter, as well as 'header' and 'header portion'). The residual space may not be used for transporting any data, in which case it is filled with padding, i.e. with bits or bytes not representing any information. Some communication systems provide the possibility to use the capacity provided by the residual space in the packets for the transport of signalling between transmitter and receiver; for example, low priority or small bandwidth control data may be transported in this way, i.e. when a residual space is available. For brevity, however, in the following discussion it will be assumed that a residual space is filled with padding. Basically, the residual space is a waste of bandwidth which poses a problem for bandwidth-limited communication systems such as wireless systems.

The possible occurrence of residual space also leads to an overhead in controlling a packet-based data transmission. This comes from the necessity to indicate the padding in the packet header. For example, in systems which add padding in the form of a padding block at the end of the payload, it has to be indicated to the receiver where the last data block ends and the padding block starts. The control of padding may in certain situations lead to a massive overhead; for instance, it is possible that two packets are required for the transport of a data block, although the data block itself (and its associated header portion) would fit into a single packet. However, the padding plus the associated header portion for the padding then leads to the two packets being required. In general, therefore, the control of residual space in a packet-based data transmission system is a non-trivial task.

As an example for a data transmission system, consider a MAC (Media Access Control) protocol, in which a MAC transmitter encapsulates data blocks called MAC service data units (SDUs) and/or MAC control messages in a MAC packet called a MAC Packet Data Unit (PDU). In a particular MAC protocol which may form part of the upcoming UMTS (Universal Mobile Telecommunications System) LTE (Long Term Evolution) wireless communication system, the header portion comprises one sub-header for each SDU.

Each sub-header comprises as a field a Radio Bearer ID (RBID) or Logical Channel ID (LCID), which indicates the radio bearer the respective data block is associated with. The RBID field allows multiplexing several data streams on the MAC layer. A MAC PDU may comprise several SDUs associated with different radio bearers. As to the notation used herein, the term 'information element' (short IE) is used as relating to a mandatory or to an optional element in a header or sub-header.

Each sub-header comprises an extension flag as a mandatory sub-header field. In each except the last sub-header the extension flag is set, which indicates that a further sub-header follows. In case of a set extension flag, a length field is present in the sub-header for indicating a length of the MAC SDU the sub-header is associated with. However, the last sub-header does not require a length field, as the receiver may determine the length of the corresponding data block from the previous length fields and the packet size (also termed 'transport block size' in the MAC framework) it has determined when receiving the packet.

A number of packet sizes (transport block sizes, TBS) are predefined for the MAC PDUs in any given communication system. For example, packets with a TBS of 32 bytes, 40 bytes, 48 bytes etc. may have been defined in a particular system. In case one or more SDUs and the MAC header do not exactly fit into a transport block provided by a lower layer, remaining bits have to be filled with padding. Of course, the more packet sizes are available, the less amount of padding will be required on average.

As an example, according to a particular MAC protocol, a MAC PDU with a TBS of 40 bytes may comprise a single SDU of 38 bytes. The MAC header then comprises a single sub-header only, which may have a length of 2 byte, e.g. 8 bits for the RBID, 1 bit for the extension flag and 7 bits other IEs or header padding (regarding header padding, many communication systems require byte-aligned headers: Therefore if the fields in the header do not exactly fill one or more bytes, some header padding is required to achieve a byte-aligned header). No residual space is left over in this case, i.e. no padding is required in the payload.

One approach for inserting a padding block into a MAC PDU is to insert a sub-header for the padding block into the header, similar to inserting a sub-header for a further data block. The RBID field in the sub-header for the padding block takes a predefined special value. The sub-header for the padding block may be the last sub-header in the header, if the padding is filled into the payload at the end of the packet. Therefore, the length field of the last sub-header associated with a data block indicates the end of the information-carrying data. The receiver may derive from the special value of the RBID field in the very last sub-header that the remaining space in the payload is residual space filled with padding.

Inserting into a MAC PDU the length field of the second last sub-header (the last sub-header associated with a data block), and inserting the sub-header for the padding block requires some space within the packet. This does not matter if the residual space is larger than the space required for inserting the additional sub-header fields, i.e. length field, RBID field and extension flag. However, it does matter if the residual space is below the space required for inserting the additional sub-header fields.

Consider, as in the example above, a packet with a TBS of 40 bytes, wherein a sub-header without length field may occupy 2 bytes. A length field may occupy 1 byte. Therefore two sub-headers lead to a minimum header size of 5 bytes, as the first sub-header includes as a mandatory field the length field. 5 bytes then is also the minimum header size in case some padding has to be included. For simplicity it is assumed that a single SDU only has to be transported. In this case, an SDU with a size of 38 bytes can be transported without padding (as above). Further, SDUs with sizes between 1 to 35 bytes can be transported. Padding is required in this case. A corresponding sub-header is inserted, such that the header size amounts to 5 bytes. The sub-header addresses the padding block with a size between of 34 bytes to 0 bytes (0 bytes means no padding block).

In case, however, the SDU has a size of 36 bytes or 37 bytes, it is determined in the transmitter that for a residual space of 2 bytes or 1 byte a sub-header has to be included to address a corresponding padding block. Therefore, two sub-headers leading to a header size of 5 bytes are included in the packet, which requires that the 36 byte or 37 byte SDU has to be subdivided into two data blocks, which have to be transported in two packets (data are received by the MAC layer from a higher layer protocol in the form of an SDU; the MAC layer handles these data in the form of one or more data blocks or packet data units, PDU). The first packet carries the 5 byte header and a first data block with 35 bytes. The second packet carries the remaining 1 byte or 2 bytes of the original SDU. If there are no further data to be transported, the second packet carries only the one or two remaining bytes of the original SDU and 33 bytes or 34 bytes of padding.

Another approach for inserting a padding block into a MAC PDU comprises to include a mandatory field into the header for indicating a length of a padding block. This field must have a sufficient length to allow addressing the maximum amount of padding that may occur. Therefore, such a header field introduces a permanent overhead to the packet-based transmission system which may be undesirable.

SUMMARY

There is a need for a technique of controlling a packet-based data transmission, wherein the overhead introduced by handling residual space in packets is minimized.

According to a first aspect of the invention, a method of controlling a packet-based data transmission is proposed, wherein a packet comprises in a payload portion one or more data blocks and in a header portion one sub-header for each one of the one or more data blocks. The one or more sub-headers comprise a length indicator in case a further sub-header follows, the length indicator indicating a length of the data block the sub-header is associated with. The method comprises the following steps in a transmitter: determining a packet size of the packet; determining a data size of the packet as a size of the one or more data blocks to be transmitted in the packet; determining a size of the sub-headers required for the one or more data blocks to be transmitted; and constructing, in case an amount of residual space in the packet is below a predefined threshold value, a last one of the one or more sub-headers by setting the length indicator to a value indicating to a receiver that no further sub-header follows; wherein the residual space results from a mismatch between the packet size and the sum of at least the data size and the size of the sub-headers.

The determination of the amount of residual space may be performed implicitly or explicitly. In case of an explicit determination of the amount of residual space in the packet, a calculation may comprise to compare the packet size with the sum of at least the data size and the size of the sub-headers. If the header comprises further information elements not associated with any sub-header, the size of these IEs has also to be included in the calculation.

The steps indicated above may not necessarily be performed in the indicated order. For example, the steps of determining the packet size, data size and the size of the sub-headers may be performed in any order or may be performed in parallel. Also, some of these steps may be performed implicitly. For example, in one implementation of the invention during construction of a packet one or more data blocks may be prepared as forming units to be included in the payload of the packet and one or more sub-headers may be prepared as forming units to be included in the header of the packet. Then, a total size of the ensemble of these already prepared units of the packet may be determined only, without explicitly determining (and buffering) separately a data size and a size of the sub-headers.

Also the residual space in the packet may be determined by explicit calculation or may be determined implicitly, for example by accessing a predetermined mapping table. The table may indicate, e.g., for any viable combination of packet size on the one hand and data size as well as sub-header size on the other hand the corresponding residual space. In another implementation, the mapping table gives the amount of residual space for each viable combination of packet size on the one hand and data size as well as number of data blocks to be included in the payload on the other hand.

The method according to this aspect of the invention may be performed in case the residual space is below a size of the sub-header fields required to address a padding block. In this case, the predefined threshold value may be set to a size of a sub-header. This size may be given as the sum of the sizes of the information elements included in the sub-header according to at least one of a configuration of a particular communication system for performing the data transmission and the communication or communications the one or more data blocks in the packet belong to.

In one mode of the invention, the predefined threshold value may be set to the size of a sub-header including a length indicator. Assuming, for example, that the transmission of data is performed according to a MAC protocol as illustrated above, the size of a sub-header may be determined which includes an RBID, an extension flag, and a length field. These sub-header fields can address a padding block as in the example above, although the length field on the one hand and the RBID and extension flag on the other hand belong to different sub-headers.

The residual space in the packet may be filled with at least one of a padding block, the length indicator in the last sub-header itself (as the length indicator is not a mandatory element in the last sub-header), and control data to be transmitted from the transmitter to the receiver.

According to a second aspect of the invention, a method of receiving a packet-based data transmission is proposed, wherein a packet comprises in a payload portion one or more data blocks and in a header portion one sub-header for each one of the one or more data blocks. The one or more sub-headers comprise a length indicator in case a further sub-header follows, the length indicator indicating a length of the data block the sub-header is associated with. The method comprises the following steps in a receiver: detecting a length indicator in a last one of the one or more sub-headers of the received packet; determining a value to which the length indicator is set; and establishing, based on the determined value, that no further sub-header follows.

In one mode of the invention, which is related to at least one of the first and the second aspect of the invention, the one or more sub-headers comprise an extension field indicating, when set, the length indicator and an optional further sub-header to follow. The sub-header may be included in case the respective indication of the extension field is not 'overwritten' by the value of the length indicator indicating to the receiver that no further sub-header follows.

In one implementation of the invention related to the first and/or second aspect of the invention, the length indicator may be set to a value pointing outside the payload portion of the packet. For example, the value may indicate a point before the beginning of the packet (e.g., a negative value) or the beginning of the payload. In one realization of this implementation, the length indicator may be set to a value pointing behind the end of the packet, e.g. behind the last bit of the payload.

In another implementation of the invention, the length indicator is set to a predefined fixed value indicating to the receiver that no further sub-header follows. The value may be reserved for this purpose. For example, a bit combination such as '0b111 . . . 11' wherein every bit is set may be used as the reserved value. In these two implementations, the padding may be represented by the inserted length indicator itself. For instance, if the length indicator occupies 1 byte of space, its insertion into the last sub-header can be used to fill 1 byte of residual space.

In still another implementation of the invention, the length indicator indicates a size of the associated data block and is thus set to a value pointing to the or any padding block in the payload portion of the packet. The receiver may, e.g., determine that the amount of padding represented by this padding block is below a specified threshold value, e.g. below 3 bytes or the size of a sub-header required for inserting a padding, possibly including a length indicator. As a result, the receiver may establish based upon the threshold value and the indicated size that the length indicator is the only indicator for the padding block and that no further sub-header (for indicating the padding) follows.

In some variants of the first and/or second aspect of the invention, the last sub-header is associated with the or any padding block. In this case, the space filled by the length field may contribute to the filling of the residual space. In this case, the length field may, e.g., point to the same padding block as addressed by the last sub-header.

According to a third aspect of the invention, a further method of controlling a packet-based data transmission is proposed, wherein a packet comprises one or more data blocks in a payload portion and one or more information elements in a header portion. The method comprises the following steps in a transmitter: Determining a packet size of the packet; determining a data size of the packet as a size of the one or more data blocks to be transmitted in the packet; determining a size of the information elements in the header portion; and inserting, into the header portion, as a header field a residual space indicator, wherein the residual space indicator is adapted to indicate an amount of residual space in the packet below a predefined threshold value, the residual space resulting from a mismatch between the packet size and a sum of at least the data size and the size of the information elements in the header portion.

The residual space indicator may be used to indicate padding, e.g. a padding block in the payload, or control data. Correspondingly, the residual space in the packet may be filled with at least one of a padding block and control data to be transmitted from the transmitter to a receiver.

One variant of this aspect may comprise the further steps of determining that the residual space is at least equal to the threshold value; and inserting, based on the determination, a sub-header associated with at least a part of the residual space. The residual space indicator may, e.g., be used in conjunction with a sub-header for indicating padding. The residual space indicator may be set to a value indicating the or any padding block. For example, both the residual space indicator and the sub-header may address the same padding block or may address two different padding blocks arranged, e.g., one after another at the end of the payload of a packet or at different positions in the packet. In other variants, the residual space indicator may be set to zero if the residual space is above the threshold value, such that, e.g., a further sub-header may only be used to address a padding block.

According to a fourth aspect of the invention, a method of receiving a packet-based data transmission is proposed, wherein a packet comprises one or more data blocks in a payload portion and one or more information elements in a header portion. The method comprises the following steps in a receiver: Extracting from the header portion of a received packet as an information element a residual space indicator; determining a value to which the residual space indicator is set; and establishing, based on the determined value, an amount of residual space in the packet; wherein the residual space indicator is adapted to indicate the amount of residual space below a predefined threshold value, the residual space resulting from a mismatch between a packet size of the packet and a sum of a size of the one or more data blocks transmitted in the packet and a size of the information elements in the header portion of the packet.

One realization of this aspect of the invention comprises the further step of extracting from the header portion a sub-header associated with at least a part of the residual space. For example, the residual space indicator may address a portion of a padding block, whereas the extracted sub-header (and possibly a length indicator in a preceding sub-header) can address the entire padding block or the remaining portion of the padding block.

In an implementation related to at least one of the third and fourth aspect of the invention, the residual space indicator may be limited to indicating at most an amount of residual space in the packet below the predefined threshold value, i.e. the length of the residual space indicator field may allow only the addressing of, e.g., padding or control data blocks which are smaller in size than the threshold value. The length of the residual space indicator field and the threshold value thus correspond to each other.

For instance, the length of the residual space indicator may be chosen to allow indicating a length of the residual space at most below (or at most equal) to a sum of sizes of information elements required in the header for inserting a padding block or control data. The threshold value will then be set to this sum.

The residual space indicator may be a mandatory information element (field) in the header portion. The size of the residual space indicator may, e.g., be a fraction of a byte. For example, in case a sum of sizes of sub-header fields required for inserting a padding block amounts to 3 bytes, a 2 bit field for the residual space indicator would be sufficient to address a padding block of 0, 1 or 2 bytes (and either 3 bytes or leaving one reserved value). In case the residual space amounts to 3 bytes or more, an additional sub-header may be inserted to address a further padding. The residual space indicator may then be set to zero, or a predefined, reserved value, which could e.g. be 0b11 in the above example. The residual space indicator may be inserted at the beginning of the header portion before a first of the one or more sub-headers associated with the data blocks.

In one realization related to at least one of the third and fourth aspect of the invention, the transmission of data is performed according to a Media Access Control (MAC) protocol, and a data transmission packet given by a MAC Packet Data Unit (PDU) comprises as data blocks one or more MAC Service Data Units (SDUs).

According to a fifth aspect of the invention, a computer program product comprising program code portions for implementing the steps of any one of the method aspects described herein when the computer program product is executed on one or more computing devices, for example a transmitter or a receiver in a mobile station or a radio base station in a wireless communications network such as an UMTS LTE network. The computer program product may be stored on a computer readable recording medium, such as a permanent or re-writeable memory within or associated with a computing device or a removable CD-ROM or DVD. Additionally or alternatively, the computer program product may be provided for download to a computing device, for example via a network such as the Internet or a communication line such as a telephone line.

According to a sixth aspect of the invention, a transmitter adapted for controlling a packet-based data transmission is proposed, wherein a packet comprises in a payload portion one or more data blocks and in a header portion one sub-header for each one of the one or more data blocks; and the one or more sub-headers comprise a length indicator in case a further sub-header follows, the length indicator indicating a length of the data block the sub-header is associated with. The transmitter comprises a first determination component adapted to determine a packet size of the packet; a second determination component adapted to determine a data size of the packet as a size of the one or more data blocks to be transmitted in the packet; a third determination component adapted to determine a size of the sub-headers required for the one or more data blocks to be transmitted; and a sub-header construction component adapted to construct, in case an amount of residual space in the packet is below a predefined threshold value, a last one of the one or more sub-headers by setting the length indicator to a value indicating to a receiver that no further sub-header follows; wherein the residual space results from a mismatch between the packet size and the sum of at least the data size and the size of the sub-headers.

According to a seventh aspect of the invention, a receiver adapted for receiving a packet-based data transmission is proposed, wherein a packet comprises in a payload portion one or more data blocks and in a header portion one sub-header for each one of the one or more data blocks; and the one or more sub-headers comprise a length indicator in case a further sub-header follows, the length indicator indicating a length of the data block the sub-header is associated with. The receiver comprises a detection component adapted to detect a length indicator in a last one of the one or more sub-headers of the received packet; a determination component adapted to determine a value to which the length indicator is set; and a control component adapted to establish, based on the determined value, that no further sub-header follows.

According to an eighth aspect of the invention, a transmitter adapted for controlling a packet-based data transmission is proposed, wherein a packet comprises one or more data blocks in a payload portion and one or more information elements in a header portion. The transmitter comprises a first determination component adapted to determine a packet size of the packet; a second determination component adapted to determine a data size of the packet as a size of the one or more data blocks to be transmitted in the packet; a third determination component adapted to determine a size of the information elements in the header portion; and an insertion component adapted to insert, into the header portion, as an information element a residual space indicator, wherein the residual space indicator is adapted to indicate an amount of residual space in the packet below a predefined threshold value, the residual space resulting from a mismatch between the packet size and a sum of the data size and the size of the information elements in the header portion of the packet.

According to an ninth aspect of the invention, a receiver adapted for receiving a packet-based data transmission is proposed, wherein a packet comprises one or more data blocks in a payload portion and one or more information elements in a header portion. The receiver comprises an extraction component adapted to extract from the header portion of a received packet as an information element a residual space indicator; a determination component adapted to determine a value to which the residual space indicator is set; and a control component adapted to establish, based on the determined value, an amount of residual space in the packet, wherein the residual space indicator is adapted to indicate the amount of residual space below a predefined threshold value, the residual space resulting from a mismatch between a packet size of the packet and a sum of a size of the one or more data blocks transmitted in the packet and a size of the information elements in the header portion of the packet.

According to a tenth aspect of the invention, a wireless communication system is proposed, which comprises at least one of: a transmitter according to the sixth or eighth aspect of the invention in a mobile station and a corresponding receiver according to the seventh or ninth aspect of the invention in a radio base station; and a transmitter according to the sixth or eighth aspect of the invention in the or any radio base station and a corresponding receiver according to the seventh or ninth aspect of the invention in the or any mobile station.

BRIEF DESCRIPTION OF THE DRAWINGS

In the following, the invention will further be described with reference to exemplary embodiments illustrated in the figures, in which:

FIG. 3 illustrates a second embodiment of a data packet;

FIG. 4 illustrates a third embodiment of a data packet;

FIG. 9 illustrates a fourth embodiment of a data packet;

FIG. 10 illustrates a fifth embodiment of a data packet;

DETAILED DESCRIPTION

In the following description, for purposes of explanation and not limitation, specific details are set forth, such as particular transmitter/receiver devices, communication protocols etc., in order to provide a thorough understanding of the current invention. It will be apparent to one skilled in the art that the current invention may be practised in other embodiments that depart from these specific details. For example, the skilled artisan will appreciate that the current invention may be practised with communications networks different from the UMTS LTE network employing a MAC protocol discussed below to illustrate the present invention. Rather, the invention may be practised with any packet-based data transmission system in which residual space in packets occurs. This includes for example wireless or wireline networks. This may further include transit or backbone networks configured to multiplex various data transmissions. The data transported may be speech or streaming data, like VoIP or video data or any other kind of data. For example, data representing a file or an image also may have to be subdivided into a group of data blocks. The data may also be or comprise control information, e.g. TCP acknowledgements sent by a receiving peer in a network. In the latter case the receiving peer is a transmitter in the sense of the present invention.

Those skilled in the art will further appreciate that functions explained hereinbelow may be implemented using individual hardware circuitry, using software functioning in conjunction with a general purpose computer or a programmed microprocessor, using an application specific integrated circuit (ASIC) and/or using one or more digital signal processors (DSPs). It will also be appreciated that when the current invention is described as a method, it may also be embodied in a computer processor and a memory coupled to a processor, wherein the memory is encoded with one or more programs that perform the methods disclosed herein when executed by the processor.

Figure 1:
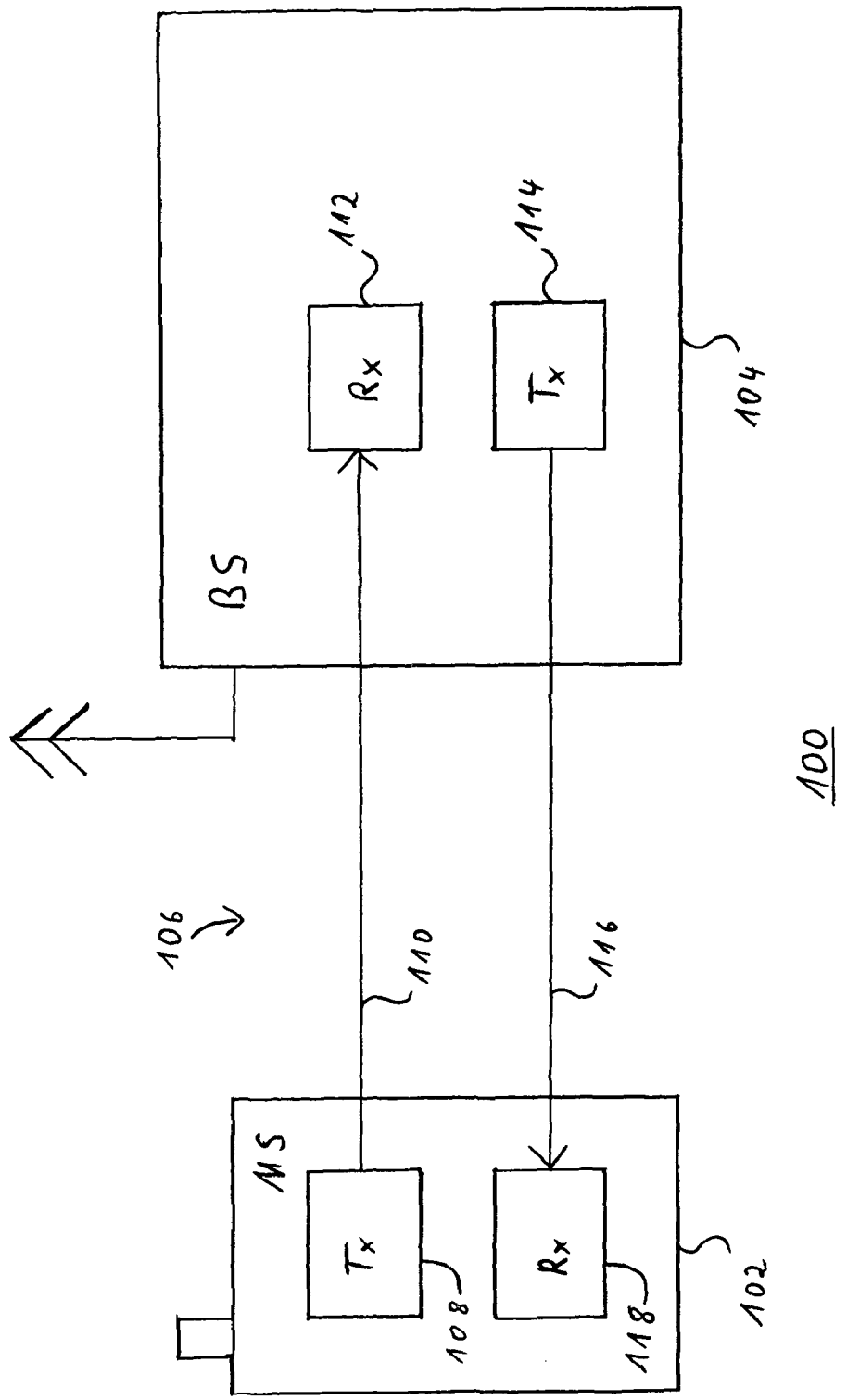
FIG. 1 illustrates an embodiment of a data transmission system.

FIG. 1 schematically illustrates an embodiment of a packet-based data transmission system 100, which may be part of a larger communication system (not shown) and comprises a mobile station (MS) 102 and a radio base station (BS) 104. MS 102 and BS 104 communicate with each other over a wireless interface 106. It is exemplarily assumed in the following that the communication system, within which the transmission system 100 is embedded, is an UMTS LTE system. Accordingly, the MS 102 may be realized as a UMTS User Equipment and the BS 104 may be realized as a UMTS Node B.

A transmitter (Tx) 108 in the MS 102 is adapted for controlling a packet-based data transmission 110 towards the BS 104. A receiver (Rx) 112 in the BS 104 is adapted for receiving the packet-based data transmission 110. A transmitter 114 in the BS 104 is adapted for controlling a packet-based data transmission 116 from the BS 104 towards the MS 102. A receiver 118 in the MS 102 is adapted for receiving the packet-based data transmission 116. At least one of the pair of transmitter 108/receiver 112 and the pair of transmitter 114/receiver 118 is adapted for minimizing the overhead introduced by handling residual space in packets transmitted in the data transmissions 110 and 116, respectively. This will be described in detail in the following.

Figure 2:
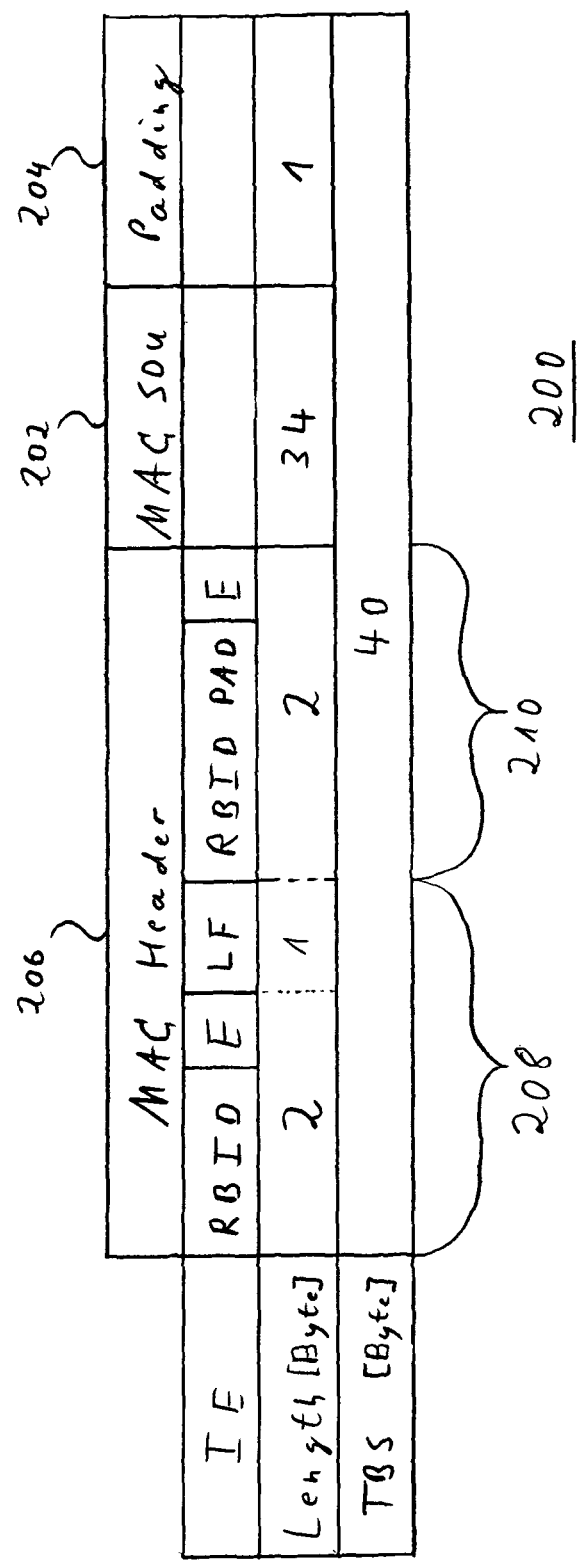
FIG. 2 illustrates a first embodiment of a data packet.

FIG. 2 schematically illustrates an embodiment of a packet 200 which may be transmitted in one of the data transmissions 110 and 116 in FIG. 1. A payload of the packet 200 comprises a single MAC SDU 202 and a padding block 204. In the example of FIG. 2, the SDU 202 comprises 34 byte and the padding block 204 comprises 1 byte. A transport block size (TBS) chosen for the packet 200 is 40 byte. The MAC header 206 comprises a first sub-header 208, which is associated with the SDU 202, and a second sub-header 210, which is associated with the padding block 204. Each of the sub-headers 208, 210 comprises as an information element (IE) a Radio Bearer ID (RBID) indicating a radio bearer with which the data of the corresponding SDU is associated. As a further IE, an extension flag (E) is included in the sub-headers 208 and 210, which, when set, indicates that the next IE is a length indicator and that optionally a further sub-header follows.

In an UMTS LTE system, the length indicator may be implemented as a length field LF as shown in FIG. 2. In this example, a sub-header without length field (such as sub-header 210) may occupy 2 bytes of space in the packet. For example, 15 bits and 1 bit may be consumed for the RBID and the extension flag, respectively. A sub-header including a length field (such as sub-header 208) comprises 3 bytes. Due to the requirement that a header may be byte-aligned and in the absence of further IEs with a length below one byte, 8 bits may be allocated to the length field LF, as shown in FIG. 2, although fewer bits would be sufficient to address all bytes of the payload of packet 200. It is to be noted that other configurations are possible. For example, an RBID field and an extension flag may occupy together 9 bits and a length field may occupy 7 bits. In case the requirement of byte-alignment has to be observed for the header, a sub-header without length field would require some form of header padding, and would thus amount to 2 bytes, just as a header including a length field. In the following, however, a configuration as illustrated in FIG. 2 will be assumed for the sake of clarity and brevity.

When constructing the packet 200 for transporting the SDU 202, the transmitter determines that padding is required. For example, assuming that packet sizes of 32 bytes and 40 bytes are available, a size of 40 bytes has to be chosen, which requires 4 bytes of padding. Consequently, the sub-header 210 is added to the header 206, which already consumes 3 bytes, such that the padding block 204 eventually has only a length of 1 byte. The last sub-header 210 of header 206 indicates to the receiver the padding block 204 by setting the RBID field to a predefined value reserved for this purpose.

FIG. 3 illustrates a second embodiment of a data packet 300. Here it is assumed that a single MAC SDU 302 with length 36 byte has to be transported in packet 300. With a data transmission scheme as illustrated in FIG. 2, 36 bytes of data and 2 header bytes would require 2 bytes of padding. However, inserting a further sub-header and a length field would require at least 3 bytes of space, leading to 41 bytes, above the TBS of packet 300 and thus requiring the remaining data to be sent in a further packet.

Instead, a different technique is employed. Again, it is exemplarily assumed that the transmitter 108 of FIG. 1 may have the technique implemented, for example in addition to the technique illustrated in FIG. 2. Only a single sub-header 304 is inserted into the MAC header 306. The extension flag E has been set in the sub-header 304, which indicates to the receiver 112 (cf. FIG. 1) that a length field LF follows. In the state of the art, this would mean that a further sub-header follows. However, the transmitter 108 sets the value of the length field LF to a value, which indicates to the receiver 112 that no further sub-header follows; i.e. the receiver 112 can determine that the following bytes belong to the SDU 302.

As the SDU 302 only amounts to 36 bytes, a padding block 308 of length 1 byte has to be added. The length field LF in packet 300 also acts to indicate the padding block 308 to the receiver 108. In particular, the length field LF is set to a value pointing to the padding block 308 in the payload portion of the packet 300. For example, the length field LF may indicate the end of the SDU 302. The receiver determines from this indication that only an amount of 1 byte space is left over behind the end of the SDU 302 in the packet 300. This is below a predetermined value, which in the example illustrated with reference to FIG. 3 may be 3 bytes (the length of a sub-header plus length field required to insert padding according to the technique illustrated in FIG. 2). Therefore, in case the receiver determines an amount of space in the payload not associated with any sub-header in the packet which is below the predetermined value, it knows that this space is filled with padding (this space was the residual space from the point of view of the transmitter when constructing the packet). An extra sub-header for this padding block is then superfluous.

The transmitter 108 may have both the techniques illustrated in FIGS. 2 and 3 implemented. The predetermined threshold value discussed above is also defined and is used by the transmitter 108 to decide which technique to employ. In case a required padding is above or equal to the threshold value of 3 bytes, the technique of FIG. 2 is applied (the total amount of padding in the packet 200 of FIG. 2 is four bytes: 1 byte for the length field LF in sub-header 208, 2 bytes for the sub-header 210 and 1 byte for the padding block 204). In case a required padding is below the threshold value of 3 bytes, the technique of FIG. 3 is utilized.

FIG. 4 illustrates a third embodiment of a data packet 400. A single MAC SDU 402 with length 37 byte has to be transported in packet 400. With the data transmission technique illustrated in FIG. 2, the SDU 402 would require 1 byte of padding to fill the packet 400, as a MAC header with mandatory fields RBID and E requires 2 bytes of space in the packet. However, inserting a length field LF and a further sub-header into the packet would require 3 bytes of space, thus exceeding the TBS of 40 bytes.

Again it is assumed that the transmitter 108 of FIG. 1 may have the technique illustrated in FIG. 4 implemented, for example in addition to the techniques illustrated in FIGS. 2 and 3. In order to avoid that the MAC SDU 402 has to be transported in two packets (MAC PDUs), the transmitter 108 inserts a single sub-header 404 into the MAC header 406. The extension flag E is set in the sub-header 404, which indicates to the receiver 112 (cf. FIG. 1) that a length field LF follows. Similar to the procedure illustrated in FIG. 3, the transmitter 108 sets the value of the length field LF to a value, which indicates to the receiver 112 that no further sub-header follows (the length indicator or length field may be interpreted by the receiver as a pointer pointing to a particular position within the payload of the packet); i.e. the receiver 112 acknowledges the following bytes as belonging to the SDU 402. Therefore, although the extension flag E may in the general case (the procedure illustrated in FIG. 2) indicate to the receiver 112 that another sub-header follows, this indication is 'over-written' by the particular value of the length field.

In contrast to the situation in FIG. 3, with the insertion of the length field LF occupying 1 byte of space in the header 404 of packet 400 the required residual space of 1 byte is already filled. A padding block is therefore not required in the payload. The transmitter 108 sets the length field LF to a value pointing outside the payload portion of the packet 400. For example, the length field LF may be set to a value pointing behind the end of the packet 400, i.e. the length field LF may indicate the length of the MAC SDU 402, 37 bytes, or may indicate a length of 38 bytes, 39 bytes or any other such value. The receiver has determined the TBS for the packet 400 at the reception of the packet and determines from a comparison of the TBS with the value of 37 bytes indicated in the LF (or 38 bytes, 39 bytes . . . ) that there is no remaining space behind the SDU 402, optionally verifying that the remaining space is below the predetermined threshold value, which has been discussed already in conjunction with FIG. 3. In this case, the receiver 112 does not expect any sub-header following after the length field LF, but interprets the entire remaining bytes behind the LF as belonging to the SDU 402. In principle, any predefined (reserved) value may be used to indicate to the receiver that no further sub-header and no further padding follows.

Therefore, while in FIG. 3 the length field LF is used to indicate a small padding block with a length below a predetermined threshold value, in FIG. 4 the length field LF itself is the only 'padding' included. In both cases, however, the insertion of sub-header fields as required according to the technique in FIG. 2 is omitted, such that only one packet is required to transport the respective SDU instead of two packets.

Figure 5:
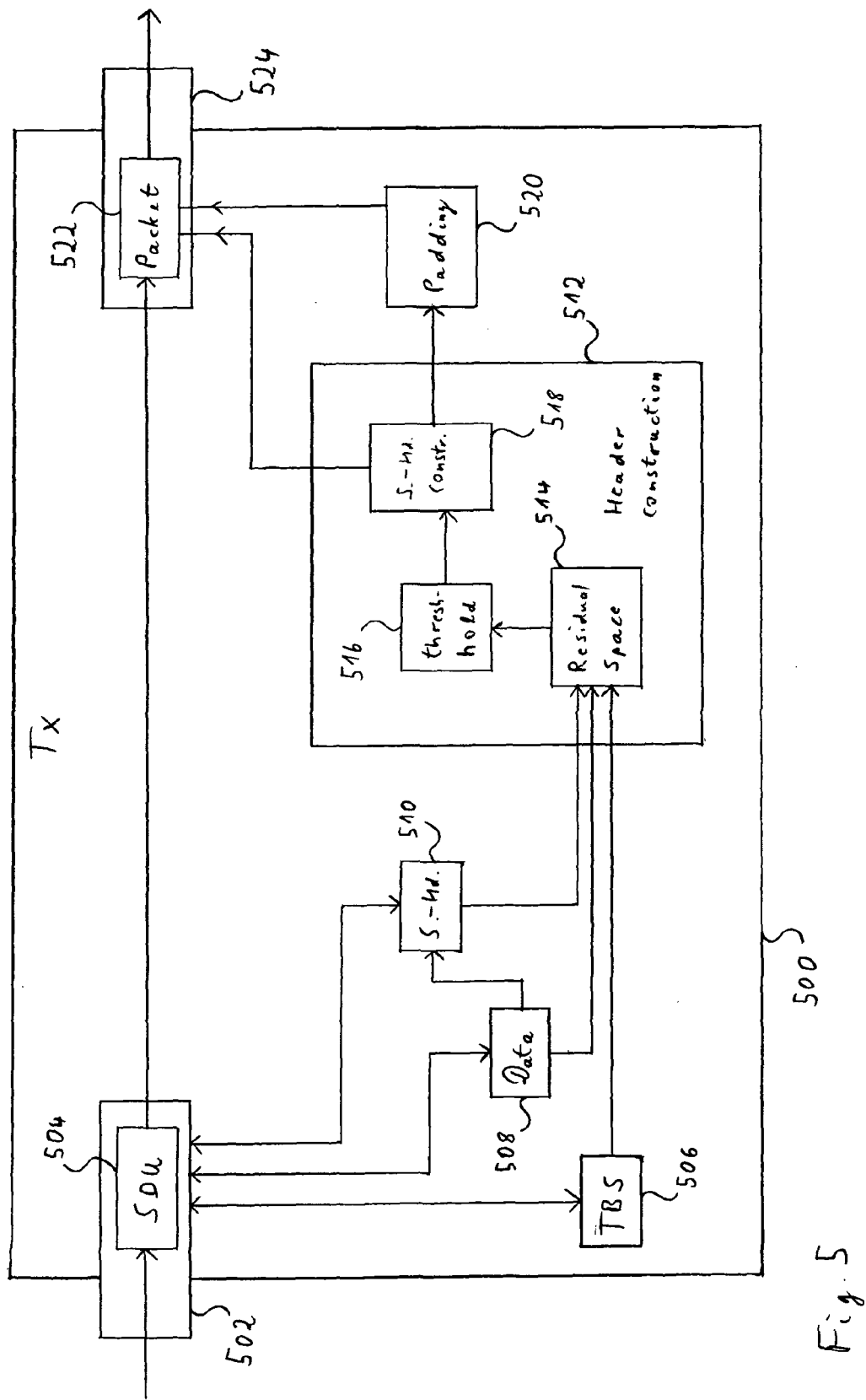
FIG. 5 illustrates functional components of a first embodiment of a transmitter.

FIG. 5 schematically illustrates functional components of an embodiment of a transmitter (Tx) 500. For the purpose of the discussion, it is assumed that the transmitter 500 is an implementation of the transmitter 108 in FIG. 1. A very similar discussion could also be given for the case that the transmitter 500 is an implementation of the transmitter 114 in FIG. 1.

The transmitter 500 comprises a data reception component 502 for receiving data to be transmitted by the transmitter 500. The transmitter 500 being implemented in the MS 102 of FIG. 1, the component 502 may receive speech data from other components of the MS 102 such as a microphone component or an A/D converter. The data may arrive as a stream of data blocks or service data units (SDUs); in other embodiments, data may be received in a format not conforming to a MAC protocol and may only be structured into one or more MAC SDUs in a transmitter. A single SDU 504 is illustrated exemplarily in the data reception component 502. For the sake of the following discussion, it will be assumed that the SDU 504 is the SDU 302 of FIG. 3 and the transmitter 500 in FIG. 5 is operating to construct the packet 300 of FIG. 3.

The transmitter 500 comprises a first determination component 506, which is adapted to determine a packet size (transport block size, TBS) of the packet to be constructed. To this end, the component 506 may inspect (or poll) an input queue (not shown) of the data reception component 502. Assuming the SDU 504, having a size of 36 bytes (cf. SDU 302 in FIG. 3) is the only data in the queue, the component 506 may derive a TBS of 40 bytes from comparing the size of the SDU 504 with available TBS values.

The transmitter 500 further comprises a second determination component 508, which is adapted to determine a data size of the packet to be constructed, the data size being a size of the one or more data blocks to be transmitted in the packet. In the example illustrated in FIG. 5, only the SDU 504 has to be transmitted. In other situations, the component 508 may summarize SDU sizes of SDUs buffered in the input queue of the reception component 504, and may also interact with the first determination component 506 in order to determine which and how many SDUs to be combine into a single packet of appropriate TBS.

Still further, the transmitter 500 comprises a third determination component 510, which is adapted to determine a size of the sub-headers required for the one or more data blocks to be transmitted. The component 510 may receive information from the second determination component 508 indicating at least the number of SDUs intended to be transported in the packet. In the example of FIG. 5, only a single SDU is available for transport, therefore the component 510 may determine that a single sub-header only may be required which occupies at least 2 bytes.

It is to be noted that all the components 506, 508, and 510 may operate in parallel or in an arbitrary order. All these components deliver their determination results to a header construction component 512, more precisely a residual space determination module 514 within the component 512. The module 514 operates to determine an amount of residual space in the packet to be constructed. To this end, the module 514 compares the TBS delivered by the component 506 with the sum of the data size and the sub-header size(s) delivered by the components 508 and 510. Referring to the example illustrated in FIG. 3, the TBS of 40 byte is compared to a data size of 36 byte and a sub-header size of 2 bytes (the header comprising a single sub-header with the mandatory RBID and E fields only). Therefore, the module 514 determines a residual space of 2 bytes.

This result is delivered to a decision logic 516 within the header construction component 512. The logic 516 decides if the residual space as determined by the unit 514 is zero, is equal to or above a predetermined threshold value, or is below the thresh-old value. In the example discussed here, the threshold value may be set to 3 bytes. The setting may be configurable, e.g., according to a particular MAC protocol used, but may be a constant for an ongoing data transmission. In case the residual space is zero, no padding at all is required (case C1). In case the residual space is equal to or above the threshold value, the technique illustrated in FIG. 2 may be used (case C2). In the example discussed here, the residual space (2 bytes) is below the threshold value (3 bytes). One of the techniques illustrated in FIGS. 2 and 3 has to be used (case C3).

The decision logic 516 indicates the decision for exactly one of the cases C1, C2 or C3 to a sub-header construction module 518. Case C1 would trigger the construction module 518 to inserting the one or more sub-headers required for corresponding SDUs into a header of the packet to be constructed. Case C2 would lead the construction module 518 to inserting a length field into the last sub-header associated with an SDU and a further sub-header for the padding into the header according to the technique illustrated in FIG. 2 (LF in sub-header 208 and sub-header 210).

In the example discussed here, the decision logic 516 indicates case C3 and the exact amount of residual space (2 bytes) to the sub-header construction module 518. The module 518 compares the amount of residual space (2 bytes) to the size a length field occupies when inserted into a sub-header (1 byte, see FIG. 3 or 4). In case the amount of residual space is above the size of the length field (case C1.1), the module 518 triggers a padding insertion component 520 in the transmitter 500 to insert a padding block at the end of the packet to be constructed, the size of the padding block given by the difference between the size of the length field LF and the amount of residual space. For the example illustrated in FIG. 3, wherein the amount of residual space is 2 bytes, the module 518 triggers the component 520 to insert the padding block 308 with a length of 1 byte at the end of packet 300.

Further, the module 518 acts to set the length field to a value indicating to the receiver 112 that no further sub-header follows. In the example discussed here, the length field LF has a value pointing towards the beginning of the padding block 308 in the packet 300 to be constructed. In this way, the module 518 constructs the sub-header as illustrated by reference numeral 304 in FIG. 3 and inserts the sub-header into the packet 522 (300).

In case the amount of residual space is equal to the size of the length field (case C1.2), the module 518 would not trigger the padding insertion component 520, as in this case the residual space is filled by the length field inserted by the module 518. In this case, the module 518 may set the value of the length field pointing to the end of the packet or beyond or to another value reserved for this purpose.

The packet 522 assembled in the way outlined above may eventually be transmitted by a packet transmission component 524.

Figure 6:
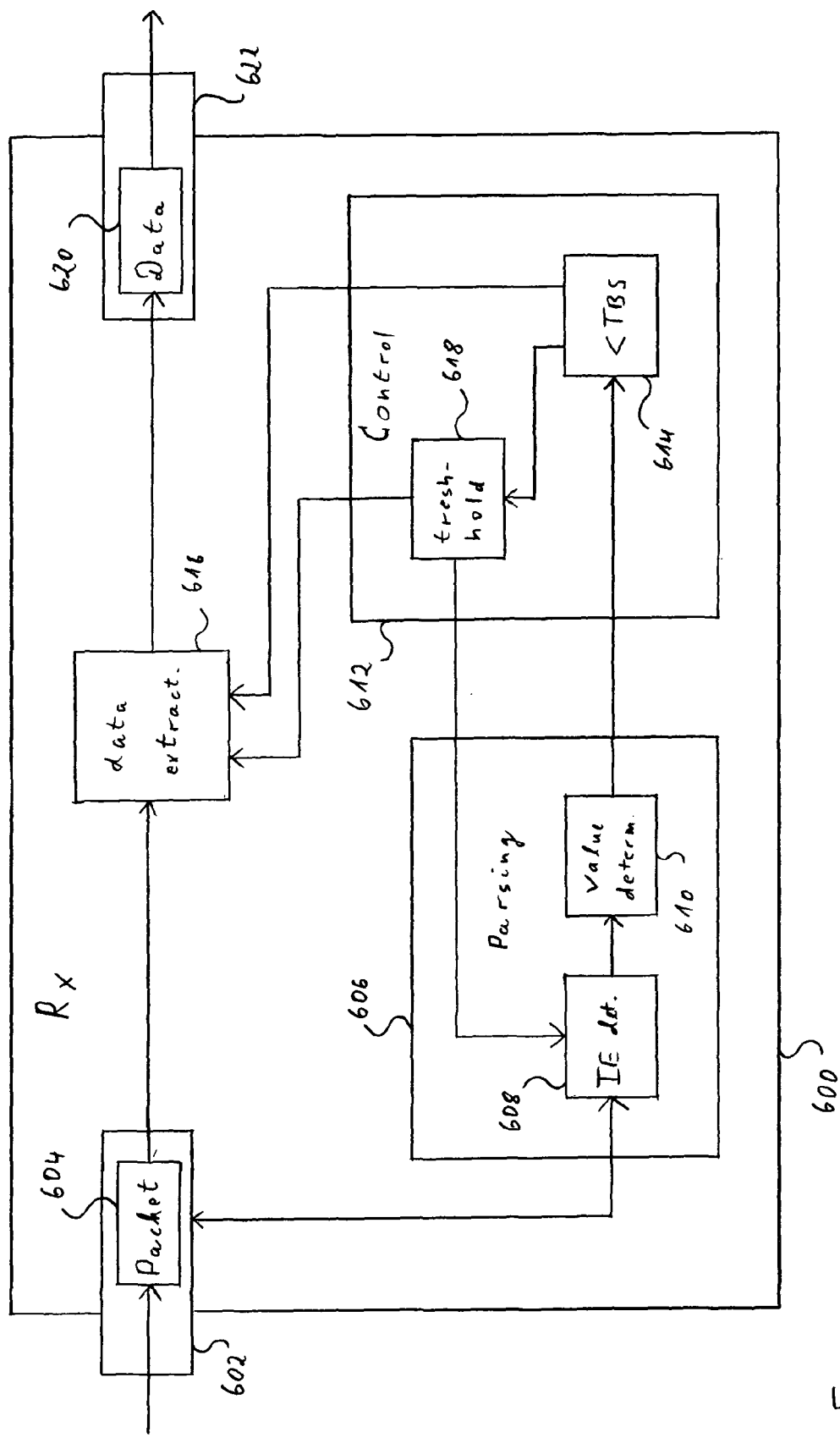
FIG. 6 illustrates functional components of a first embodiment of a receiver.

FIG. 6 schematically illustrates functional components of an embodiment of a receiver (Rx) 600. It is assumed that the receiver 600 is an implementation of the receiver 112 in FIG. 1. A similar discussion could however be given for the case that the receiver 600 is an implementation of the receiver 118 of FIG. 1.

The receiver 600 comprises a packet reception component 602 adapted for receiving packets according to a MAC protocol. As it is assumed that the receiver 600 is implemented in the BS 104 of FIG. 1, the MAC packets arrive over the wireless interface 106 and may comprise, e.g., speech data. A single MAC packet 604 is illustrated exemplarily in the packet reception component 602. It is assumed that the packet 604 is the packet 300 of FIG. 3 and the receiver 600 is operating to extract the included SDU 302 from the MAC packet.

The receiver 600 comprises a parsing module 606, which is adapted to analyse the internal structure of the received packet 604 by parsing at least its header portion. For this purpose, the parsing component 606 comprises a detection component 608, which is adapted to sequentially detect the information elements (IEs) included in the header of the packet 604. In particular, the detection component 608 is adapted to detect a length field (in MAC terminology; in general, a length indicator) LF in a last one of the one or more sub-headers of the received packet 604.

The parsing component 606 further comprises a determination component 610, which receives bit strings representing IEs detected by the detection component 608 in order to determine its value. In particular, the determination component 610 is adapted to determine a value to which the length field LF shown in FIG. 3 in the sub-header 304 is set. The determination component 610 sends the determined value to a control component 612 in the receiver 600.

The control component 612 is adapted to control the reception of packets in the receiver according to any one of the techniques illustrated in the FIGS. 2 to 4. In order to determine which of these techniques the transmitter of the packet 604 has employed, the control component comprises a first discrimination module 614, which compares the received value of the length field LF with the transport block size TBS of the packet 604, which has also been determined by the parsing component 606 or another component of the receiver 600 (not explicitly shown). In a different embodiment, in case a fixed TBS only is available for a data transmission system, the determination of the TBS of a received packet can of course be omitted.

In case it is determined in the first discrimination module 614 that the length field LF has a value above the TBS of the received packet 604, the control component 612 is adapted to establish that no further sub-header follows after the length field LF in the header of the packet 604, i.e. the payload begins immediately after the end of the length field LF (cf. FIG. 4). Further, the control component will trigger a data extraction component 616 to extract data from the packet 604 from a position immediately after the length field LF to the end of the packet 604 (i.e., no padding included).

In case it is determined in the first discrimination module 614 that the length field LF has a value below the TBS of the received packet 604, the value of the length field LF is additionally analysed in a second discrimination module 618. This module compares the difference of the TBS of the received packet 604 and the value indicated in the length field LF with a predetermined threshold value. This threshold value is the same as the threshold value described with reference to FIG. 5. In the example discussed here, the threshold value may be set to 3 bytes (the sum of sizes of the length field LF and an additional sub-header for a padding block, cf. FIG. 2 and see the corresponding discussion for the transmitter 500).

Referring to FIG. 3, the difference between the TBS of 40 byte for the packet 300 and the value indicated by the length field LF (pointing to the end of the SDU 302) amounts to 1 byte. This is below the threshold value of 3 bytes. From this, the discrimination module 618 concludes that 1. no further sub-header follows after the length field LF in the header of the packet 604 and 2. a padding block of length 1 byte is arranged at the end of the packet 604 (as illustrated in FIG. 3).

In a case in which the discrimination module 618 would find that the difference of the TBS of a received packet and a value indicated in a length field LF is above the predetermined threshold value, the module 618 would instead conclude that a further sub-header is to follow after the length field, i.e. the packet is constructed according to the technique illustrated in FIG. 2. Then, the control component 612 instructs the parsing component 606 to continue with parsing the header of the received packet.

Referring back to the example assuming the packet 604 is the packet 300 of FIG. 3, following the result of the analysis of the length field LF performed in the discrimination components 614 and 618, no trigger signal is provided to the parsing component 606, which thus stops parsing the packet 604. Instead, a trigger signal is provided to the data extraction component 616 to extract data from the packet 604 from a position immediately after the length field LF to a position 1 byte before the end of the packet 604 (i.e., 1 byte of padding included).

The data extraction component 616 extracts the data 620, i.e. the SDU 302 as illustrated in FIG. 3, accordingly and provides these data 620 to an output queue of a data forwarding component 622. The component 622 then forwards the data to further internal and external components associated with the receiver 600.

Figure 7:
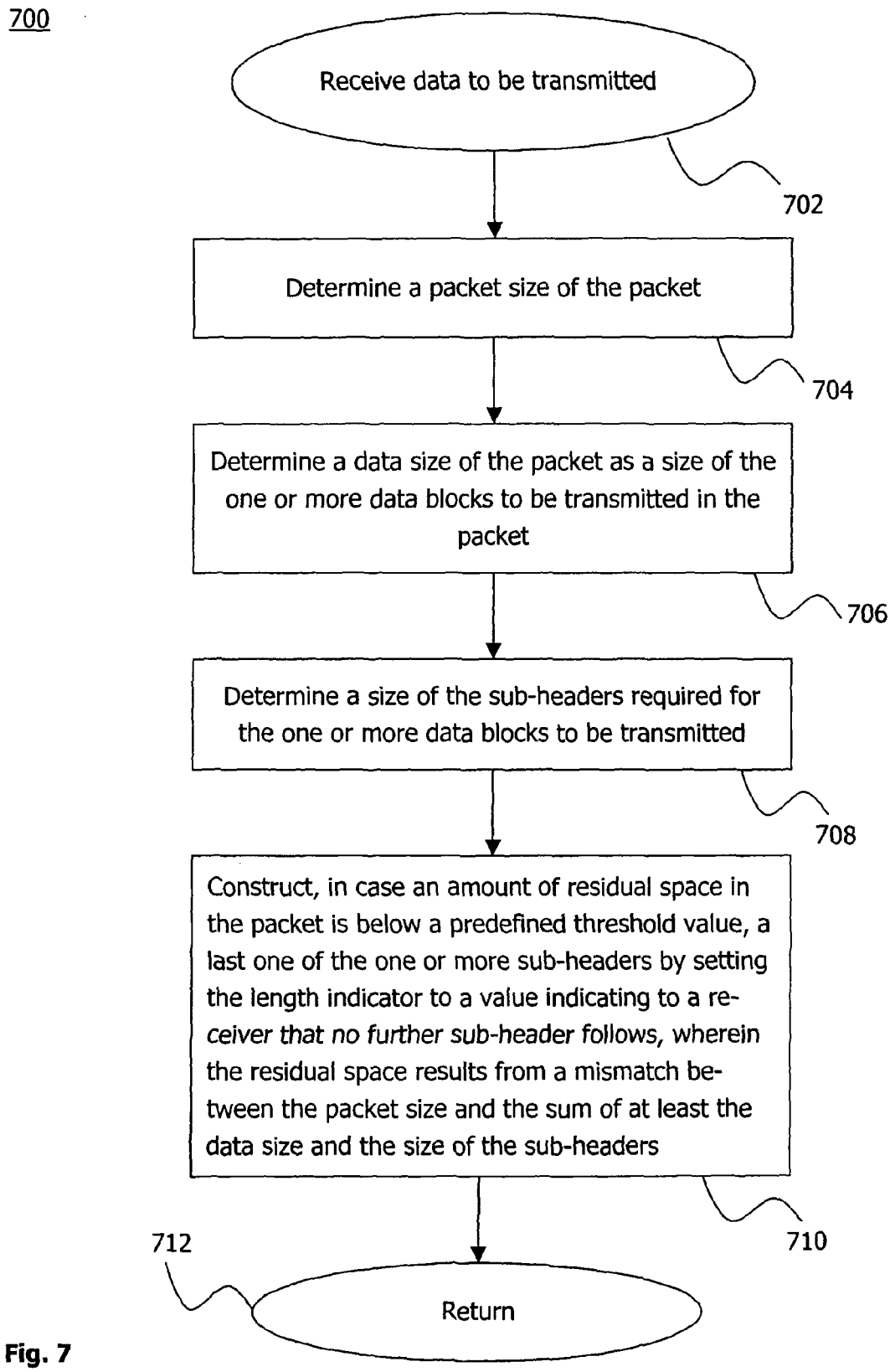
FIG. 7 is a flow diagram illustrating a first embodiment of a method for controlling a packet-based data transmission.

FIG. 7 schematically illustrates an embodiment of a method 700 for controlling a packet-based data transmission. For the method is assumed that a packet comprises in a payload portion one or more data blocks and in a header portion one sub-header for each one of the one or more data blocks. The one or more sub-headers comprise a length indicator, such as a length field LF in a MAC environment, in case a further sub-header follows, the length indicator indicating a length of the data block the sub-header is associated with.

The method 700 may be triggered in step 702 by the reception of data to be transmitted in a transmitter in which the method is performed, such as, e.g., the transmitter 500 of FIG. 5. In step 704 a packet size of the packet is determined. In step 706, a data size of the packet is determined as a size of the one or more data blocks to be transmitted in the packet. In step 708, a size of the sub-headers required for the one or more data blocks to be transmitted is determined. It is to be noted that the steps 704, 706 and 708 may in principle be performed in any order or in parallel.

In step 710, in case an amount of residual space in the packet is below a predefined threshold value, a last one of the one or more sub-headers is constructed by setting the length indicator to a value indicating to a receiver that no further sub-header follows. The residual space results from a mismatch between the packet size and the sum of at least the data size and the size of the sub-headers.

For example, the length indicator may be set to a value pointing outside the payload portion of the packet. In the alternative, the length indicator may be set to a value pointing to a padding block in the payload portion of the packet, wherein the padding block length is below the threshold value. The method returns control in step 712 to a higher layer control program for performing the construction and transmission of the packet.

Figure 8:
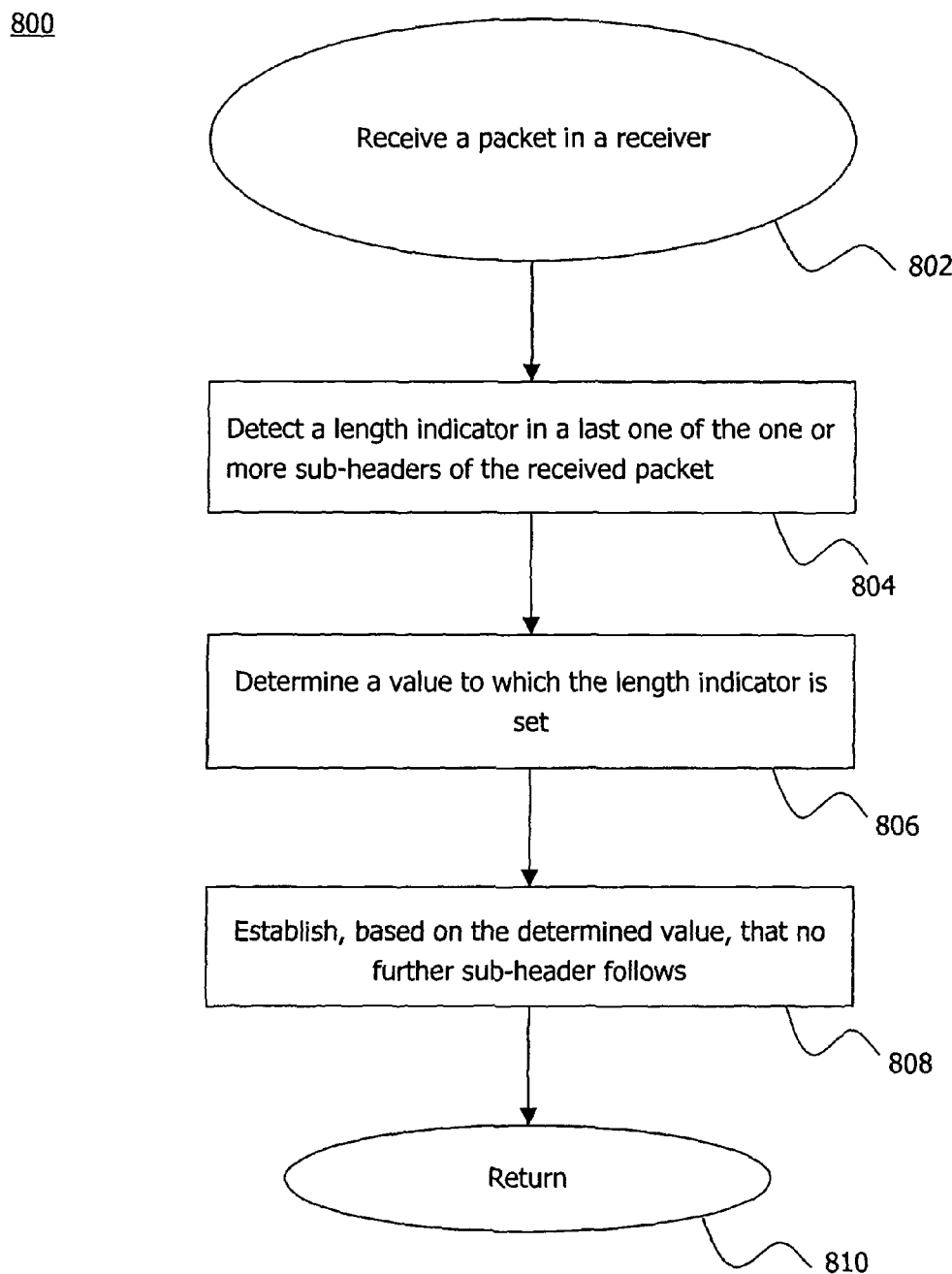
FIG. 8 is a flow diagram illustrating a first embodiment of a method of receiving a packet-based data transmission.

FIG. 8 schematically illustrates an embodiment of a method 800 of receiving a packet-based data transmission, which may be performed in a receiver such as, e.g., the receiver 600 of FIG. 6. The same prerequisites as for the method 700 in FIG. 7 apply to the method 800. The method 800 may be triggered in step 802 by the reception of a packet in the receiver. In step 804, a length indicator is detected in a last one of the one or more sub-headers of the received packet. In step 806, a value is determined to which the detected length indicator is set. In step 808, based on the determined value, it is established that no further sub-header follows. The method may return control to a higher layer control program for receiving the data packet and extracting the data in step 810.

FIG. 9 schematically illustrates another embodiment of a packet 900 which may be transmitted in one of the data transmissions 110 and 116 in FIG. 1. A single MAC SDU 902 with length 37 byte has to be transported in a packet with TBS=40 byte. A single sub-header 904 is inserted into a MAC header 906 assumed to consume 2 bytes of space, as in the example embodiments discussed before. Therefore, 1 byte of padding is needed in the packet 900.

In this embodiment, the header 906 comprises besides the sub-header 904 as a mandatory field a Small Padding Flag (SPF). The SPF is inserted at the beginning of each header and is an implementation of the residual space indicator discussed further above. It is assumed that the MAC protocol requires byte-alignment for the header 906. As in the sub-header 904 the RBID consumes 8 bit and the extension flag E 1 bit, there remain 7 unused bits in the header. Therefore the assignment of only 2 bits to the SPF does not lengthen the MAC header 906, but reduces only the amount of the required header padding (HP) to 5 bits.

According to the technique illustrated in FIG. 2, an SDU of size 37 bytes would be transported within two packets, as the sub-header fields required to indicate padding occupy 3 bytes space, leading to 42 bytes header+payload. In contrast, the SPF enables indicating a padding block size of 0, 1, 2 or 3 bytes. An extra sub-header is not required in these cases. Therefore, in the example illustrated in FIG. 9, the SDU 902 of 37 byte and the padding block 908 of 1 byte may both be addressed by a header of 2 bytes only. Therefore a single packet is sufficient to transmit the SDU.

The SPF may generally have a sufficient number of header bits assigned which allow addressing an amount of residual space below a predefined threshold value. In the example illustrated in FIG. 9, it would be sufficient to be able to address 2 bytes residual space with the SPF, as a 3 byte residual space could as well be filled with the length field LF and additional sub-header for addressing a padding block of 0 bytes (as illustrated in FIG. 2). In cases where a padding-related sub-header may only be inserted for a non-zero padding block, 3 byte of padding may be indicated with the SPF. In other cases, instead of being used as a (possibly redundant) indication of a 3 byte padding block, the respective value of the SPF may also be used as a reserved value for other purposes.

As the SPF will generally require few bits (a fraction of a byte) only, for many header configurations the insertion of the SPF will not lead to an increase in header size, in particular when considering byte-aligned header structures. The insertion of a mandatory SPF may lead on average to a reduced header size even in data transmission systems with only a moderate frequency of occurrence of residual space in packets.

In case one or more data blocks exactly fit into a packet, the static SPF may be set to a value indicating no residual space (padding). In a data transmission system employing the technique of FIG. 9, an SDU of length 36 bytes would require 2 bytes of padding; apart from this difference the packet structure would look very similar to that illustrated in FIG. 9. An SDU of length 35 bytes would require 3 bytes of padding. The padding block of 3 bytes may be addressed in a similar way as illustrated in FIG. 9 by a 2-bit SPF. Instead a padding block of 0 bytes may be indicated according to the technique of FIG. 2, while the SPF may be set to 0 bytes or any other value, depending on the implementation.

FIG. 10 illustrates an embodiment of a data packet 1000. A single MAC SDU 1002 with length 34 byte has to be transported. The MAC header 1004 comprises a 2-bit SPF similar to the SPF discussed above for FIG. 9, a first sub-header 1006 for the SDU 1002 and a second SDU 1008, which indicates a padding block 1010 with length 1 byte in a way which has been discussed in detail with reference to the embodiment of FIG. 2. Any header padding which may be necessary to byte-align the header 1004 is omitted in FIG. 10 for clarity.

FIG. 10 thus shows a combination of the techniques illustrated in FIGS. 2 and 9. The insertion of the sub-header 1008 (and the length field LF in the sub-header 1006) does not matter, as a residual space of 4 bytes has to be filled in any case; it is a matter of indifference if this space is filled with padding, some (sub-)header IEs or other data such as control data.

The SPF may be set to a value indicating 0 bytes, as the padding block 1010 is anyway addressed by the sub-header 1008. The SPF may also be set to the actual padding block size of 1 byte; the receiver has, however, necessarily to parse the sub-header 1008 to be able to identify it as the last sub-header. The SPF may also be set to a value indicating a padding of 2 bytes or 3 bytes or in general to an arbitrary value. In these cases the implementation in the receiver has to assure that this value is overwritten by the indication determined from the padding-related sub-header. The SPF may also be set to a specific reserved value indicating that a sub-header related to padding (or data which fills the residual space) follows.

It is to be noted that other implementations may combine the techniques discussed with reference to the FIGS. 3 and 4 with the SPF illustrated in FIGS. 9 and 10. Moreover, in principle several padding blocks may be addressed by the various techniques disclosed herein.

Figure 11:
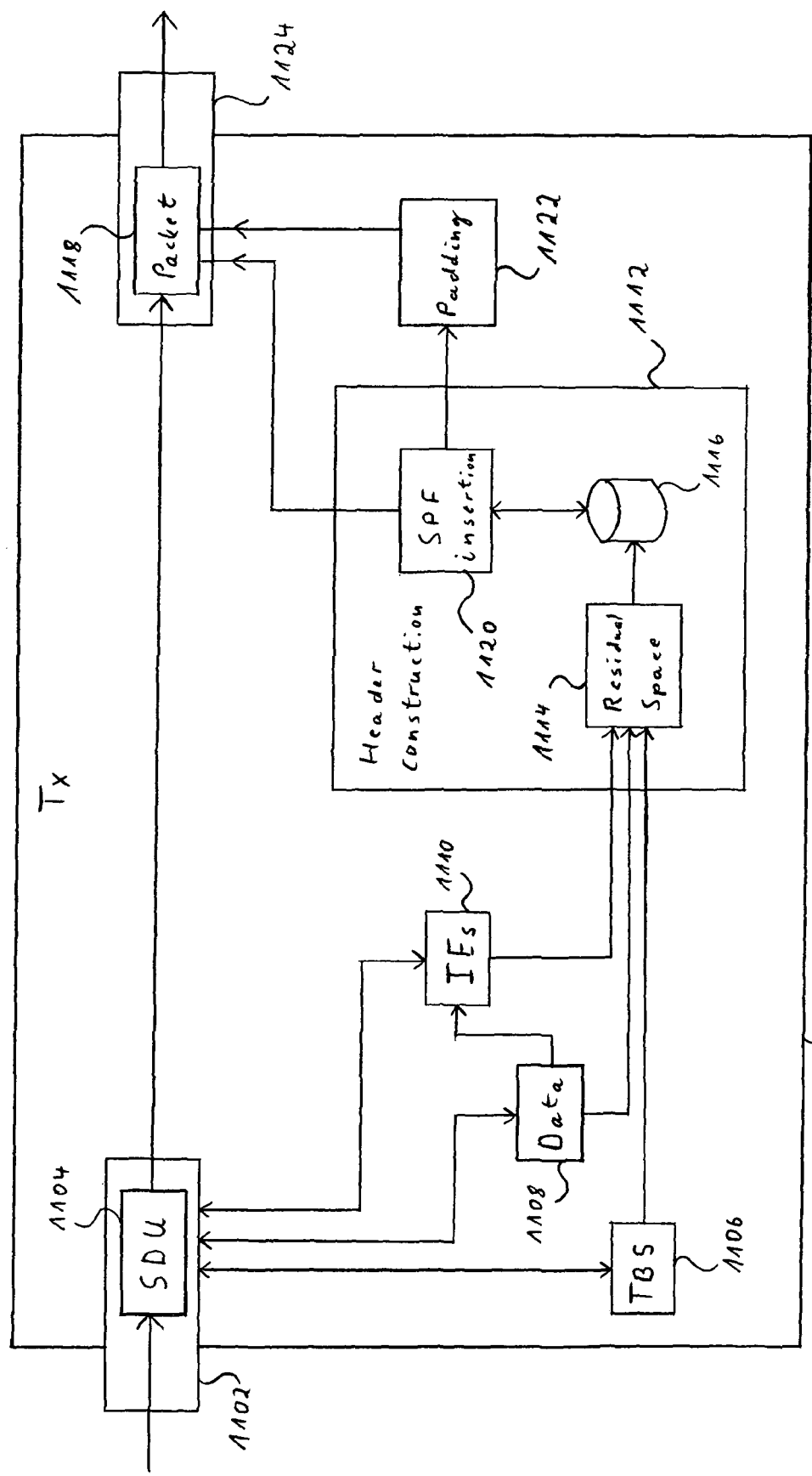
FIG. 11 illustrates functional components of a second embodiment of a transmitter.

FIG. 11 schematically illustrates a second embodiment of a transmitter (Tx) 1100, which is assumed to be a realization of the transmitter 108 of FIG. 1 and may be implemented therein in addition or as an alternative to the transmitter 500 illustrated in FIG. 5. A similar discussion could also be given for the case that the transmitter 1100 is an implementation of the transmitter 114 in FIG. 1.

As various components of the transmitter 1100 are similar in their functionality to corresponding components in the transmitter 500, description of functionalities and possible modifications of such components is omitted or kept brief. The description of FIG. 5 may be referred to in this respect.

The transmitter 1100 comprises a data reception component 1102 for receiving data to be transmitted by the transmitter 1100. The data may arrive as a stream of MAC SDUs. A single SDU 1104 is illustrated exemplarily in the data reception component 1102. For the sake of the following discussion, it will be assumed that the SDU 1104 is the SDU 902 of FIG. 9 and the transmitter 1100 is operating to construct the packet 900 of FIG. 9.

The transmitter 1100 comprises a first determination component 1106, which is adapted to determine a transport block size (TBS) of the packet to be constructed in a way as described for the corresponding component 506 in FIG. 5. As the SDU 902 has a size of 37 bytes (see FIG. 9), the component 1106 may derive a TBS of 40 bytes from comparing the size of the SDU 904 with available TBS values. The transmitter 1100 further comprises a second determination component 1108, which is adapted to determine a data size of the packet to be constructed, the data size being a size of the one or more data blocks to be transmitted in the packet.

The transmitter 1100 further comprises a third determination component 1110, which is adapted to determine a size of information elements (IEs) in the header. The component 1110 receives information from the second determination component 1108 indicating at least the number of SDUs intended to be transported in the packet. For the packet 900 of FIG. 9, a single SDU 902 is available for transport, therefore the component 1110 may determine that a single sub-header only may be required to build the header 906, which therefore occupies 2 bytes.

In detail, the determination component 1110, when calculating a preliminary value for the header size of the packet to be constructed, may first determine the size of mandatory header fields not included in sub-headers. In the example of FIG. 9, the only mandatory header field is the SPF, which has a size of 2 bits. In a next step, the component may add to the size of mandatory IEs the size of the required sub-headers. In the example of FIG. 9, a single sub-header 904 is required for the single SDU 902. The sub-header has a size of 9 bits (mandatory sub-header fields RBID+E). Due to the requirement of byte-alignment, 5 bits of header padding have to be added. Thus, the determination component 1110 arrives at a header size of 2 bytes. This result is preliminary, as possibly a further sub-header for a residual space (e.g. padding) has to be inserted.

The components 1106, 1108, and 1110 may operate in parallel or in any arbitrary order. The components 1106, 1108 and 1110 deliver their determination results to a header construction component 1112, more precisely to a residual space determination module 1114 within the component 1112. The module 1114 operates to determine an amount of residual space in the packet to be constructed. To this end, the module 1114 compares the TBS delivered by the component 1106 with the sum of the data size and the preliminary header size delivered by the components 1108 and 1110. For the example packet 900 illustrated in FIG. 9, the TBS of 40 bytes is compared to a data size of 37 byte and a preliminary header size of 2 bytes. The module 1114 determines a residual space amounting to 1 byte. The module 1114 may buffer the determined value in a buffer 1116.

The packet to be constructed by the transmitter for transporting the SDU 1104 is schematically indicated as packet 1118 in FIG. 11. The header construction component 1112 comprises an insertion component 1120, which is adapted to insert into the header portion of the packet 1116 as a header field a residual space indicator. In the example discussed here, this indicator is the 2-bit SPF illustrated in header 906 in FIG. 9. The SPF is designed to indicate an amount of residual space in the packet 1118 below a predefined threshold value. This threshold value amounts to 3 bytes, as for the example illustrated in FIG. 5.

To determine the value of the SPF, the insertion component 1120 accesses the buffer 1116 and retrieves the amount of residual space (1 byte) for the packet 1118 to be constructed.

The insertion component 1120 compares the amount of residual space to the threshold value. As the amount of residual space (1 byte) is below the threshold value, the insertion component directly inserts this value as the SPF into the packet 1118. Various possibilities exist for the operation of the insertion component 1120 in case the residual space would be equal to or above the amount of residual space. As an example, the insertion component 1120 may set the SPF to a value indicating zero bytes padding. As another example, the insertion component 1120 may set the SPF to the maximum value which the SPF can indicate (a 2-bit SPF may at most indicate 3 bytes padding).

The header construction component 1112 may comprise a sub-header insertion module (not shown) adapted to insert a sub-header associated with a padding block in case that padding is required equal to or above the threshold value.

In case the SPF is set to a non-zero value, the insertion component 1120 triggers a padding insertion component 1122 in the transmitter 1100 to insert a padding block at the end of the packet to be constructed, wherein the size of the padding block is given by the value the SPF is set to. For the example illustrated in FIG. 9, the component 1120 triggers the padding insertion component 1122 to insert a padding block with a length of 1 byte at the end of packet, namely the padding block 908 in packet 900. Depending on the implementation, a similar trigger from the above-mentioned sub-header insertion component may overwrite the trigger signal from the SPF insertion component 1120 to the padding insertion component 1122, or may lead to the insertion of two padding blocks.

The transmitter 1100 comprises a padding insertion component 1122 adapted to insert a padding block, if necessary, at the end of the packet 1118 to be constructed (possibly triggered by the header construction component 1112 or a control component of the transmitter 1100, which is not shown in FIG. 11). The padding insertion component 1122 also accesses the buffer 1116 to retrieve the For the example illustrated in FIG. 3, wherein the amount of residual space is 2 bytes, the module 518 triggers the component 520 to insert the padding block 308 with a length of 1 byte at the end of packet 300.

The packet 1118 assembled in the way outlined above may eventually be transmitted by a packet transmission component 1124.

Figure 12:
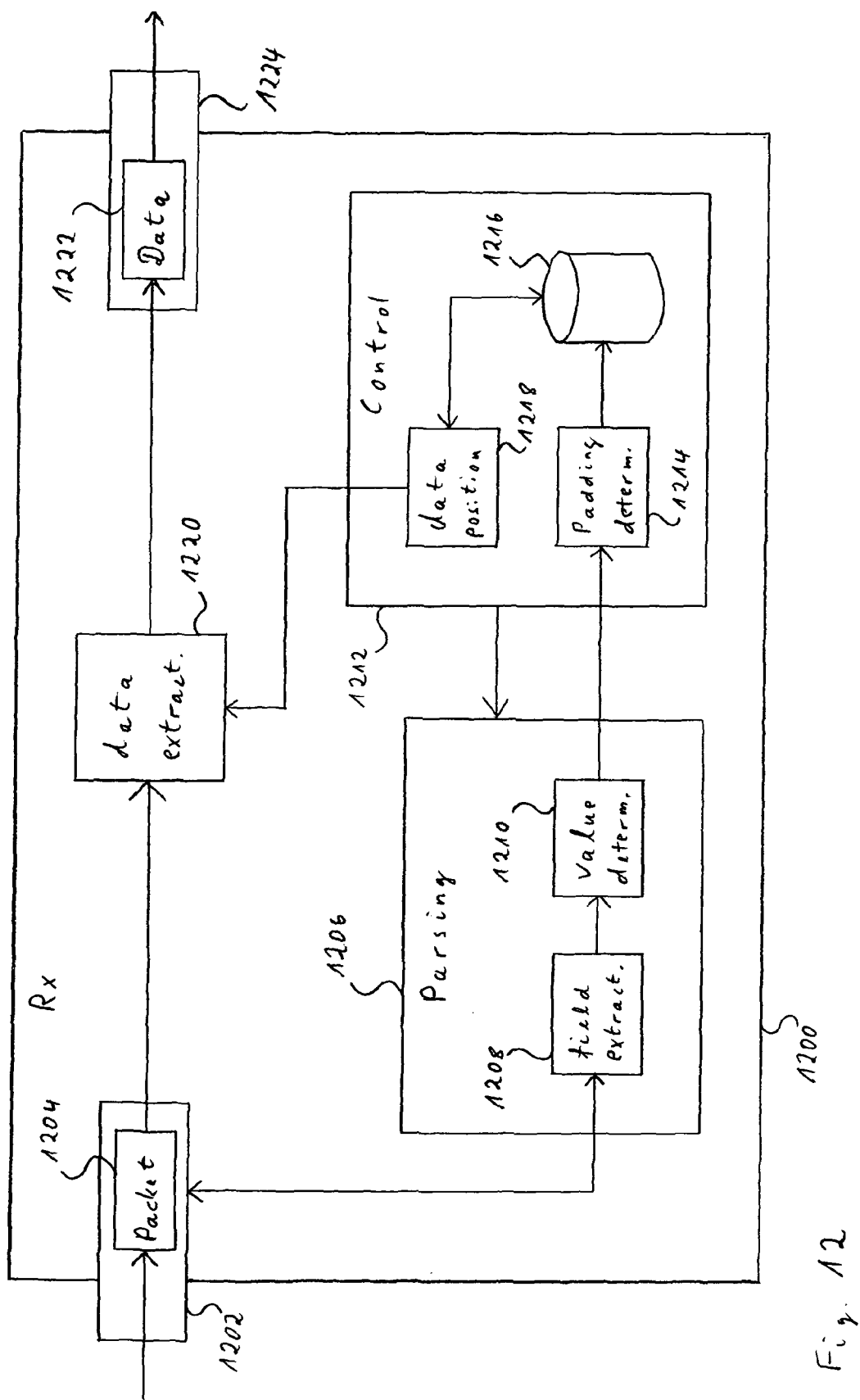
FIG. 12 illustrates functional components of a second embodiment of a receiver.

FIG. 12 schematically illustrates functional components of a second embodiment of a receiver (Rx) 1200, which is assumed to be a realization of the receiver 112 of FIG. 1 and may be implemented therein in addition or as an alternative to the receiver 600 illustrated in FIG. 6.

As various components of the receiver 1200 are similar in their functionality to corresponding components in the receiver 600, description of functionalities and possible modifications of such components is omitted or kept brief. The description of FIG. 6 may be referred to in this respect.

The receiver 1200 comprises a packet reception component 1202 adapted for receiving packets according to a MAC protocol. A single MAC packet 1204 is illustrated exemplarily in the packet reception component 1202. It will be assumed in the following that the packet 1204 is the packet 900 of FIG. 9 and the receiver 1200 is operating to extract the included SDU 902 from the MAC packet 900.

The receiver 1200 comprises a parsing module 1206, which is adapted to analyse the internal structure of the received packet 1204 by parsing at least its header portion. For this purpose, the parsing component 1206 comprises a header field extraction component 1208, which is adapted to extract (mandatory) header fields included in the header of the packet 1204. In particular, the detection component 1208 is adapted to extract from the header portion of the received packet 1204 as a mandatory header field a residual space indicator; the residual space indicator is represented by the Small Padding Field SPF as illustrated in FIG. 9 which is inserted into any MAC header as the first IE (the SPF is assumed to be a mandatory field), irrespective if any padding is included in the packet or not.

The parsing component 1206 further comprises a determination component 1210, which receives bit strings representing header fields extracted by the detection component 1208 in order to determine its value. In particular, the determination component 1210 is adapted to determine a value to which the SPF shown in FIG. 9 in the MAC header 906 is set. The determination component 1210 sends the determined value to a control component 1212 in the receiver 600.

The control component 1212 is adapted to control the reception of packets in the receiver according to at least the techniques illustrated in FIG. 2 and FIG. 9. In order to determine an amount of padding actually included in the received packet 1204 (and possibly the location of padding blocks in the packet), a padding determination module 1214 acts to buffer the received value of the SPF in a buffer 1216. Having buffered the SPF value, the module 1214 (or any other module of the control component 1212) may trigger the parsing module 1206 to continue with the extraction of header fields or, more generally, the detection of optional or mandatory information elements in the header of the packet 1204.

The parsing module may detect a sub-header associated with padding (e.g. in way described with respect to the receiver embodiment of FIG. 6). Here it is assumed that the packet 1204 does not contain such a sub-header. When the parsing component 1206 has finished parsing the header of the packet 1204, an SDU position module 1218 retrieves the SPF value stored in buffer 1216, uses this value to derive a position of the SDU contained in the packet 1204, and triggers a data extraction component 1220 to extract the SDU from the packet 1204 from a position immediately after the MAC header to a position as indicated by the SPF value. For the example packet 900 of FIG. 9, the SPF value indicates an end position 1 byte before the end of the packet (i.e. excluding the padding block 908).

In case the parsing module 1206 detects a sub-header associated with padding, various possibilities exist for an appropriate operation of the control component 1212. As an example, the padding determination module 1214 may overwrite the buffered SPF value with a value determined from a length field LF in a penultimate sub-header (cf. FIG. 10) or from a length field LF in a last sub-header of the packet (cf. FIG. 3). In other embodiments, all values determined to indicate some padding are combined to arrive at a total amount of padding arranged, e.g. at the end of the packet.

The data extraction component 1220 extracts the SDU from the packet 1204 as indicated by the SDU position module 1218 and provides the data 1222 of the SDU to an output queue of a data forwarding component 1224.

Figure 13:
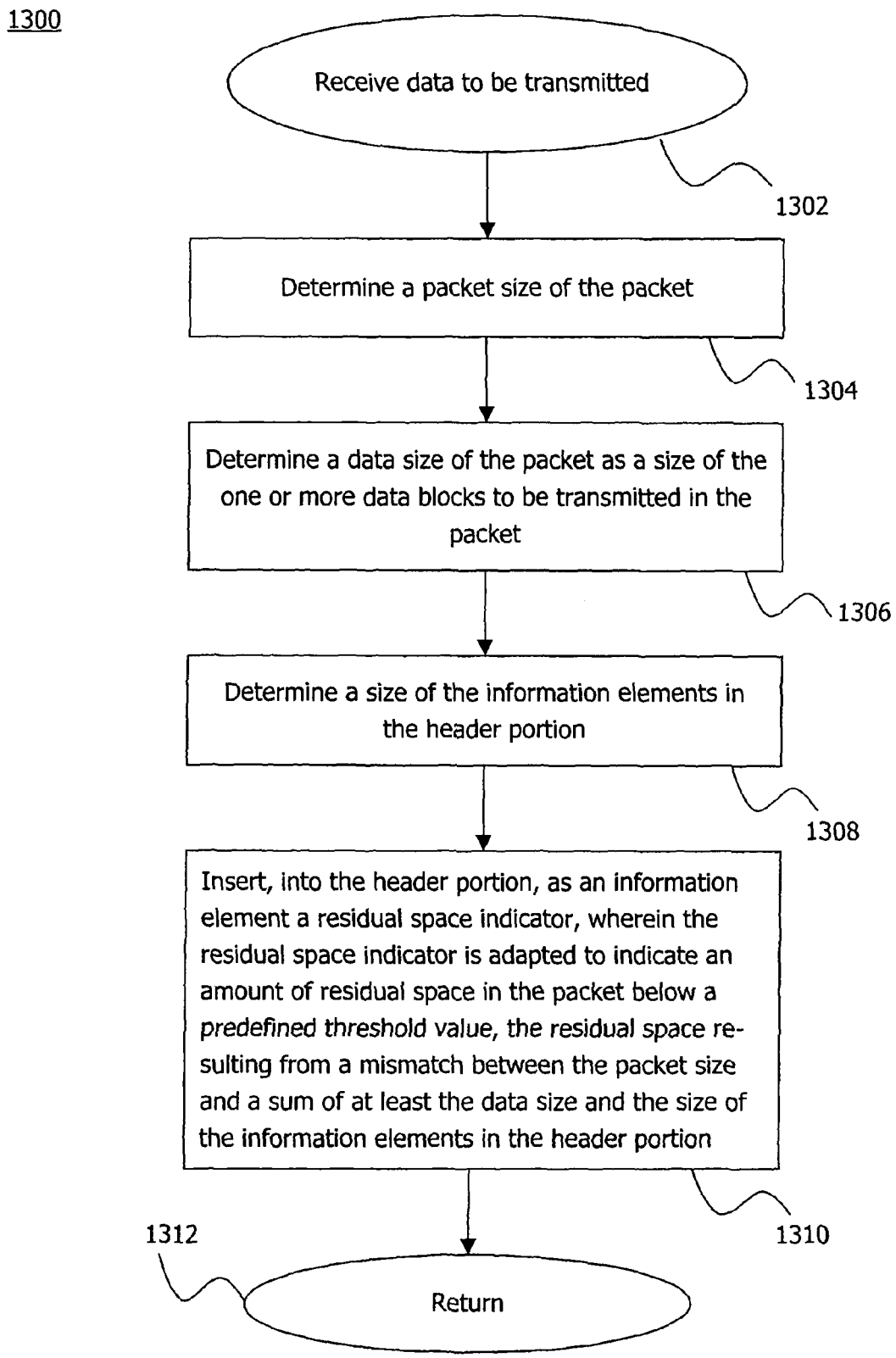
FIG. 13 is a flow diagram illustrating a second embodiment of a method for controlling a packet-based data transmission.

FIG. 13 illustrates an embodiment of a method 1300 of controlling a packet-based data transmission. For the method 1300 it is assumed that a packet comprises one or more data blocks in a payload portion and one or more information elements (IEs) in a header portion, the IEs comprising optional IEs such as IEs belonging to optional sub-headers and mandatory IEs or fields. The method 1300 may be performed, e.g., in the transmitter 500 of FIG. 5.

Execution of the method may be triggered in step 1302 by the reception of data in the transmitter. In step 1304, a packet size of the packet to be constructed is determined. In step

1306, a data size of the packet is determined as a size of the one or more data blocks to be transmitted in the packet. In step 1308, a size of the information elements in the header portion of the packet is determined. A preliminary header size may thus be determined: The IEs may comprise the IEs of one or more sub-headers required for the one or more data blocks to be transported in the packet plus the size of any IEs in the header not associated with any sub-header. The size of a sub-header associated with padding (cf. FIG. 2), if any, may not be included in this preliminary header size, as the padding is to be determined in subsequent steps. It is to be noted that the steps 1304, 1306 and 1308 may in principle be performed in any order or in parallel.

In step 1310, a residual space indicator is inserted into the header portion of the packet as an information element. The residual space indicator is adapted to indicate an amount of residual space in the packet below a predefined threshold value, the residual space resulting from a mismatch between the packet size and a sum of at least the data size and the size of the information elements in the header portion. The method 1300 returns control in step 1312 to a higher layer control program for constructing the packet.

In one realization, the method may additionally comprise the steps of determining that the residual space is at least equal to the threshold value; and inserting, based on the determination, a sub-header associated with at least a part of the residual space.

Figure 14:
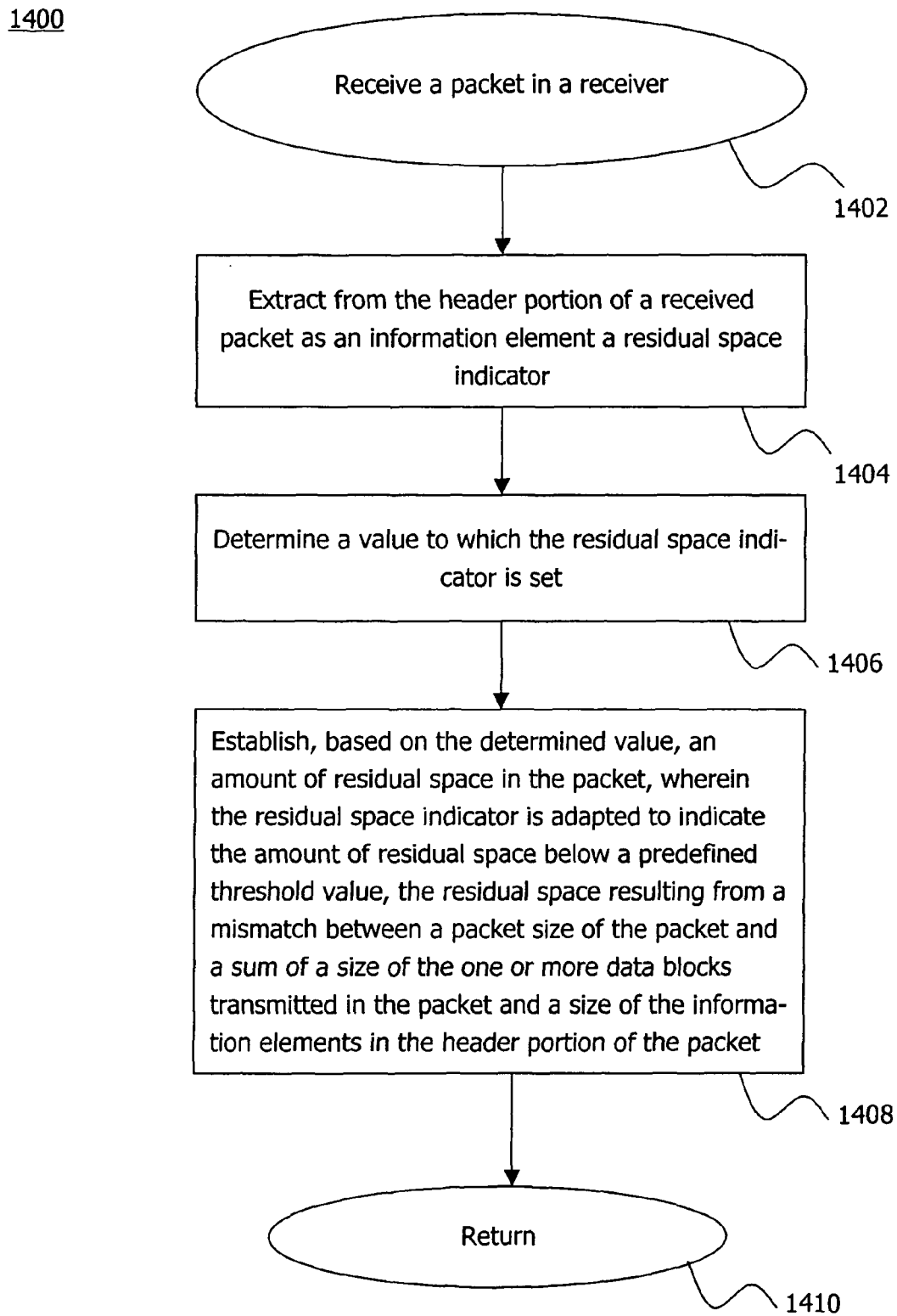
FIG. 14 is a flow diagram illustrating a second embodiment of a method of receiving a packet-based data transmission.

FIG. 14 illustrates an embodiment of a method 1400 of receiving a packet-based data transmission. The method may be performed under the same prerequisites as the method 1300 of FIG. 13. The method may be performed in any one of the receivers 112 and 118 of FIG. 1.

The method may be triggered in step 142 by the reception of a packet in the receiver. In step 1404 a residual space indicator is extracted from the header portion of the received packet as an information element. In step 1406, a value is determined, to which the residual space indicator is set. In step 1408, based on the determined value, an amount of residual space in the packet is established, wherein the residual space indicator is adapted to indicate the amount of residual space below a predefined threshold value, the residual space resulting from a mismatch between a packet size of the packet and a sum of a size of the one or more data blocks transmitted in the packet and a size of the information elements in the header portion of the packet. In step 1410, the method returns control to a higher layer control program for extracting data from the received packet in the receiver.

The techniques disclosed herein allow to minimize the overhead caused by managing residual space. As the size of packet headers is reduced considerably, the available bandwidth in a data transmission system, e.g. in a wireless communication system, is used more efficiently. The proposed techniques may be particularly applied in cases in which a small amount of residual space is to be handled, wherein 'small' means residual space of the order of a sub-header size (typically few bytes). As an example, packet-based speech transmissions (VoIP) may comprise transmitting a low data rate sequence of data blocks representing the speech, wherein the data blocks have a typical, albeit slightly varying size. A packet size should allow transporting the largest data blocks; therefore the frequently occurring slightly smaller data blocks leave frequently some residual space in the packet.

Adding a short mandatory padding indicator on average may reduce the header size, even if the padding indicator is present also in cases where no padding is required. Adding in a static way of view bits for the padding indicator in the header is more than compensated for in case the splitting of the data blocks in two packets can be omitted. In particular, in communication systems which require that the header must be byte-aligned, for example two bits for the padding indicator may easily be reserved, which would otherwise be remain unused. Re-using an existing header field, in particular a sub-header field, such as the length indicator even does not require any additional static reserved bits in the header.

While the current invention has been described in relation to its preferred embodiments, it is to be understood that this disclosure is for illustrative purposes only. Accordingly, it is intended that the invention be limited only by the scope of the claims appended hereto.

The invention claimed is:

1. A method of controlling a packet-based data transmission, wherein a packet comprises in a payload portion one or more data blocks and in a header portion one sub-header for each one of the one or more data blocks, and the one or more sub-headers comprise a length indicator in case a further sub-header follows, the length indicator indicating a length of the data block the sub-header is associated with, and wherein the method comprises the following steps in a transmitter:
   determining a packet size of the packet;
   determining a data size of the packet as a size of the one or more data blocks in the payload portion;
   determining a size of the sub-headers required for the one or more data blocks in the header portion;
   determining an amount of residual space in the packet resulting from a mismatch between the packet size and the sum of at least the data size and the size of the sub-headers; and
   inserting, in case an amount of residual space in the packet is below a predefined threshold value, a length indicator into a last one of the one or more sub-headers and setting the inserted length indicator to a value indicating to a receiver that no further sub-header follows.

2. The method of claim 1, wherein the predefined threshold value is set to a size of a sub-header.

3. The method of claim 2, wherein the predefined threshold value is set to the size of a sub-header including a length indicator.

4. The method of claim 1, wherein the residual space in the packet is filled with at least one of a padding block, the length indicator in the last sub-header and control data to be transmitted from the transmitter to the receiver.

5. The method of claim 1, wherein the residual space is filled with a padding block and wherein the length indicator is set to a value pointing to the padding block in the payload portion of the packet.

6. The method of claim 5, wherein the last sub-header is associated with the padding block.

7. A method of receiving a packet-based data transmission, wherein a packet comprises in a payload portion one or more data blocks and in a header portion one sub-header for each one of the one or more data blocks, and the one or more sub-headers comprise a length indicator in case a further sub-header follows, the length indicator indicating a length of the data block the sub-header is associated with, and wherein the method further comprises the following steps in a receiver:
   receiving a packet;
   detecting a length indicator in a last one of the one or more sub-headers of the received packet;
   determining a value to which the length indicator is set; and
   establishing, based on the determined value, that no further sub-header follows.

8. The method of claim 7, wherein the one or more sub-headers comprise an extension field indicating, when set, the length indicator and an optional further sub-header to follow the length indicator.

9. The method of claim 7, wherein the length indicator is set to a value pointing outside the payload portion of the packet.

10. The method of claim 9, wherein the length indicator is set to a value pointing behind the end of the packet.

11. The method of claim 7, wherein the length indicator is set to a predefined fixed value indicating to the receiver that no further sub-header follows.

12. A method of controlling a packet-based data transmission, wherein a packet comprises one or more data blocks in a payload portion and one or more information elements in a header portion, and wherein the method comprises the following steps in a transmitter:
   determining a packet size of the packet;
   determining a data size of the packet as a size of the one or more data blocks in the payload portion;
   determining a size of the information elements in the header portion;
   determining an amount of residual space resulting from a mismatch between the packet size and a sum of at least the data size and the size of the information elements in the header portion of the packet;
   comparing the amount of residual space to a predefined threshold value, wherein the predefined threshold value is set below or equal to a sum of sizes of information elements required for inserting a padding block or control data;
   determining, in case the amount of residual space is below the predefined threshold value, a value of a residual space indicator as the amount of residual space, wherein the residual space indicator is limited to indicate at most an amount of residual space in the packet below the predefined threshold value; and
   inserting, into the header portion, as an information element, the residual space indicator.

13. The method of claim 12 further comprising:
   determining that the residual space is at least equal to the threshold value; and
   inserting, based on the determination, a sub-header associated with at least a part of the residual space.

14. The method of claim 12, wherein the residual space in the packet is filled with at least one of a padding block and control data to be transmitted from the transmitter to a receiver.

15. The method of claim 12, wherein the residual space indicator is a mandatory information element in the header portion.

16. The method of claim 12, wherein the transmission of data is performed according to a Media Access Control (MAC) protocol, and a data transmission packet given by a MAC Packet Data Unit (PDU) includes as data blocks one or more MAC Service Data Units (SDUs).

17. A method of receiving a packet-based data transmission, wherein a packet comprises one or more data blocks in a payload portion and one or more information elements in a header portion, the method comprising the following steps in a receiver:
   extracting from the header portion of a received packet as an information element a residual space indicator, wherein the residual space indicator is limited to indicate at most an amount of residual space in the packet below a predefined threshold value;
   determining a value to which the residual space indicator is set; and
   establishing, based on the determined value, an amount of residual space in the packet;
   wherein the residual space results from a mismatch between a packet size of the packet and a sum of a size of the one or more data blocks in the payload portion of the packet and a size of the information elements in the header portion of the packet;
   wherein the residual space indicator is configured to indicate the amount of residual space below or equal to the predefined threshold value below or equal to a sum of sizes of information elements required for inserting a padding block or control data.

18. The method of claim 17, comprising the further step of extracting from the header portion a sub-header associated with at least a part of the residual space.

19. The method of claim 17, wherein the size of the residual space indicator is a fraction of a byte.

20. The method of claim 17, wherein the residual space indicator is inserted at the beginning of the header portion before a first of one or more sub-headers associated with the data blocks.

21. A transmitter configured for controlling a packet-based data transmission, wherein a packet comprises in a payload portion one or more data blocks and in a header portion one sub-header for each one of the one or more data blocks, and the one or more sub-headers comprise a length indicator in case a further sub-header follows, the length indicator indicating a length of the data block the sub-header is associated with, and wherein the transmitter comprises:
   a first determination component configured to determine a packet size of the packet;
   a second determination component configured to determine a data size of the packet as a size of the one or more data blocks to be transmitted in the packet;
   a third determination component configured to determine a size of the sub-headers required for the one or more data blocks to be transmitted;
   a component configured to determine an amount of residual space in the packet, wherein the residual space results from a mismatch between the packet size and the sum of at least the data size and the size of the sub-headers; and
   a header construction component configured to insert, in case an amount of residual space in the packet is below a predefined threshold value, a length indicator into a last one of the one or more sub-headers and set the inserted length indicator to a value indicating to a receiver that no further sub-header follows.

22. A receiver configured for receiving a packet-based data transmission, wherein a packet comprises in a payload portion one or more data blocks and in a header portion one sub-header for each one of the one or more data blocks, and the one or more sub-headers comprise a length indicator in case a further sub-header follows, the length indicator indicating a length of the data block the sub-header is associated with, and wherein the receiver comprises:
   a detection component configured to detect a length indicator in a last one of the one or more sub-headers of the received packet;
   a determination component configured to determine a value to which the length indicator is set; and
   a control component configured to establish, based on the determined value, that no further sub-header follows.

23. A transmitter configured for controlling a packet-based data transmission, wherein a packet comprises one or more data blocks in a payload portion and one or more information elements in a header portion, and wherein the transmitter comprises:
- a first determination component configured to determine a packet size of the packet;
- a second determination component configured to determine a data size of the packet as a size of the one or more data blocks to be transmitted in the packet;
- a third determination component configured to determine a size of the information elements in the header portion;
- a component configured to determine an amount of residual space resulting from a mismatch between the packet size and a sum of at least the data size and the size of the information elements in the header portion of the packet;
- a component configured to compare the amount of residual space to a predefined threshold value, wherein the predefined threshold value is set below or equal to a sum of sizes of information elements required for inserting a padding block or control data;
- a component configured to determine, in case the amount of residual space is below the predefined threshold value, a value of a residual space indicator as the amount of residual space, wherein the residual space indicator is limited to indicate at most an amount of residual space in the packet below the predefined threshold value; and
- an insertion component configured to insert, into the header portion, as an information element the residual space indicator.

24. A receiver configured for receiving a packet-based data transmission, wherein a packet comprises one or more data blocks in a payload portion and one or more information elements in a header portion, and wherein the receiver comprises:
- an extraction component configured to extract from the header portion of a received packet as an information element a residual space indicator, wherein the residual space indicator is limited to indicate at most an amount of residual space in the packet below a predefined threshold value;
- a determination component configured to determine a value to which the residual space indicator is set; and
- a control component configured to establish, based on the determined value, an amount of residual space in the packet;
- wherein the residual space results from a mismatch between a packet size of the packet and a sum of a size of the one or more data blocks transmitted in the packet and a size of the information elements in the header portion of the packet; wherein the residual space indicator is configured to indicate the amount of residual space below the predefined threshold value below or equal to a sum of sizes of information elements required for inserting a padding block or control data.

* * * * *

UNITED STATES PATENT AND TRADEMARK OFFICE
CERTIFICATE OF CORRECTION

PATENT NO.         : 8,228,915 B2
APPLICATION NO.    : 12/666093
DATED              : July 24, 2012
INVENTOR(S)        : Meyer et al.

It is certified that error appears in the above-identified patent and that said Letters Patent is hereby corrected as shown below:

In Fig. 5, Sheet 4 of 12, for Tag "516", in Line 1, delete "thresh-hold" and insert -- threshold --, therefor.

In Fig. 6, Sheet 5 of 12, for Tag "648", in Line 1, delete "thresh-hold" and insert -- threshold --, therefor.

In Column 1, Line 17, delete "data is" and insert -- data --, therefor.

In Column 6, Line 64, delete "0b11" and insert -- '0b11' --, therefor.

In Column 13, Line 17, delete "thresh-old" and insert -- threshold --, therefor.

Signed and Sealed this
Second Day of October, 2012

David J. Kappos
*Director of the United States Patent and Trademark Office*